United States Patent [19]

Fiebig et al.

[11] Patent Number: 5,008,805
[45] Date of Patent: Apr. 16, 1991

[54] REAL TIME, FAIL SAFE PROCESS CONTROL SYSTEM AND METHOD

[75] Inventors: Carolyn A. B. Fiebig, Burtonsville; Mike R. Fuqua, Frederick; Suresh K. Gursahaney, Gaithersburg; Gregg M. Margosian, Germantown; Mark H. Weiss, Gaithersburg, all of Md.

[73] Assignee: International Business Machines Corporation, Armonk, N.Y.

[21] Appl. No.: 389,023

[22] Filed: Aug. 3, 1989

[51] Int. Cl.$^5$ .............................................. G06F 11/20
[52] U.S. Cl. .................................. 364/184; 364/187; 364/132; 371/9.1
[58] Field of Search ............... 364/131, 132, 133, 134, 364/140, 184, 187, 200, 900; 371/8.2, 9.1, 11.1–11.3, 29.1; 370/16.1, 16.2

[56] References Cited

U.S. PATENT DOCUMENTS

| | | | |
|---|---|---|---|
| 3,665,173 | 5/1972 | Bouricius et al. | 307/204 |
| 3,882,455 | 5/1975 | Heck et al. | 340/172.5 |
| 3,905,023 | 9/1975 | Perpiglia | 340/172.5 |
| 4,204,249 | 5/1980 | Dye et al. | 364/200 |
| 4,212,059 | 7/1980 | Sato et al. | 364/200 |
| 4,455,601 | 6/1984 | Griscom et al. | 364/200 |
| 4,491,087 | 7/1990 | Kap | 364/187 |
| 4,672,530 | 6/1987 | Schuss | 364/187 |
| 4,775,976 | 10/1988 | Yokoyama | 371/9.1 |
| 4,847,837 | 7/1989 | Morales et al. | 371/8.2 |
| 4,872,106 | 10/1989 | Slater | 364/200 |

OTHER PUBLICATIONS

E. D. Baker, et al., "Redundant System Clocks for Hardware Fault Tolerant Computers", IBM Technical Disclosure Bulletin, 12/88, p. 127.

L. Balliet, et al., "Bus Architecture for Passive Fault-Tolerant Command/Response System", IBM Tech. Disc. Bull., 8/86, p. 1313.

C. W. Ellis et al., "Cross Connected Busses in a Dual-Microprocessor Environment", IBM Tech. Disl. Bull., 12/87, p. 136.

Primary Examiner—Jerry Smith
Assistant Examiner—Paul Gordon
Attorney, Agent, or Firm—John E. Hoel

[57] ABSTRACT

A real time control system is disclosed for controlling the sequential execution of scheduled operatons such as in process control or broadcast scheduling applications. The system uses a fail safe feature characterized as a sender/listener architecture. An external clock input to the sender and the listener assures synchronous sequential stepping through identical schedules stored in each processor. Under normal operation, the sender processor controls the execution of events as they are sent from a host computer connected to the system, Unscheduled events or errors are processed by being added to the schedule in real time for both the sender and listener processors. The listener processor monitors the sender's signaling in the controlled network and, in the case of a failure in the sender, the listener immediately assumes control of the system as the new sender. The listener executes commands which were omitted by the failing sender during the takeover interval and it then resumes the originally intended schedule of process control events.

15 Claims, 13 Drawing Sheets

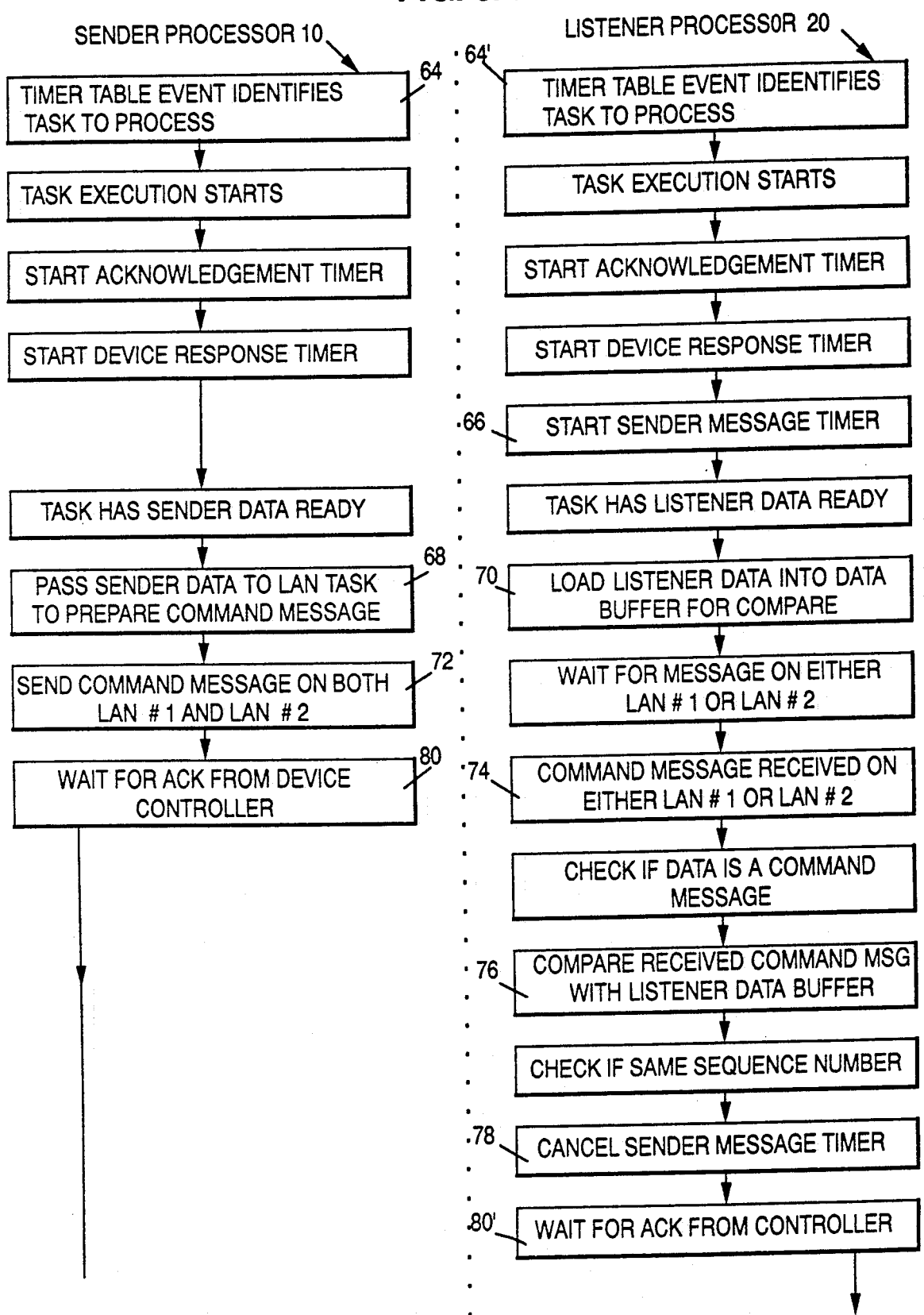

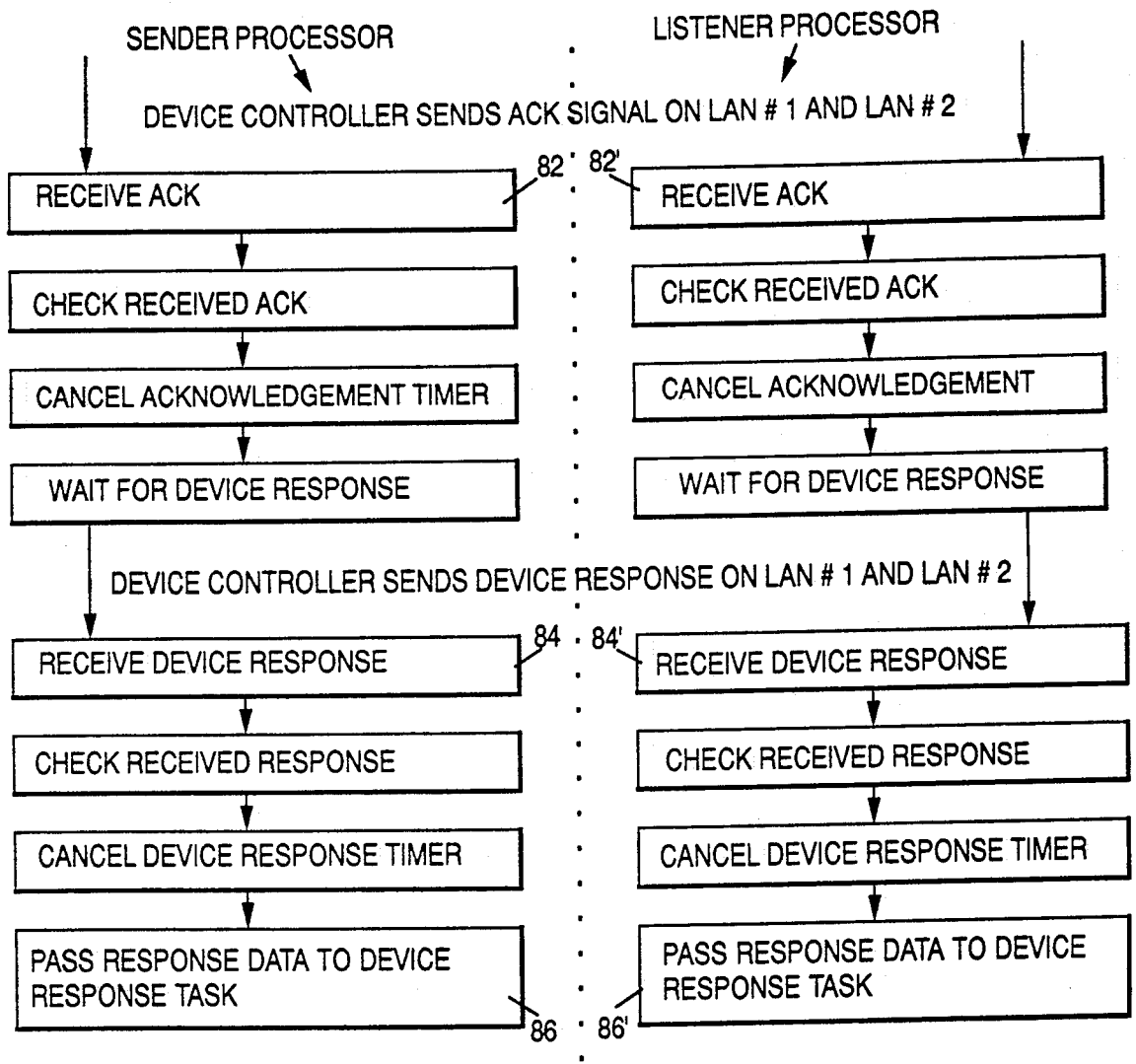
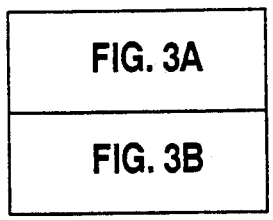

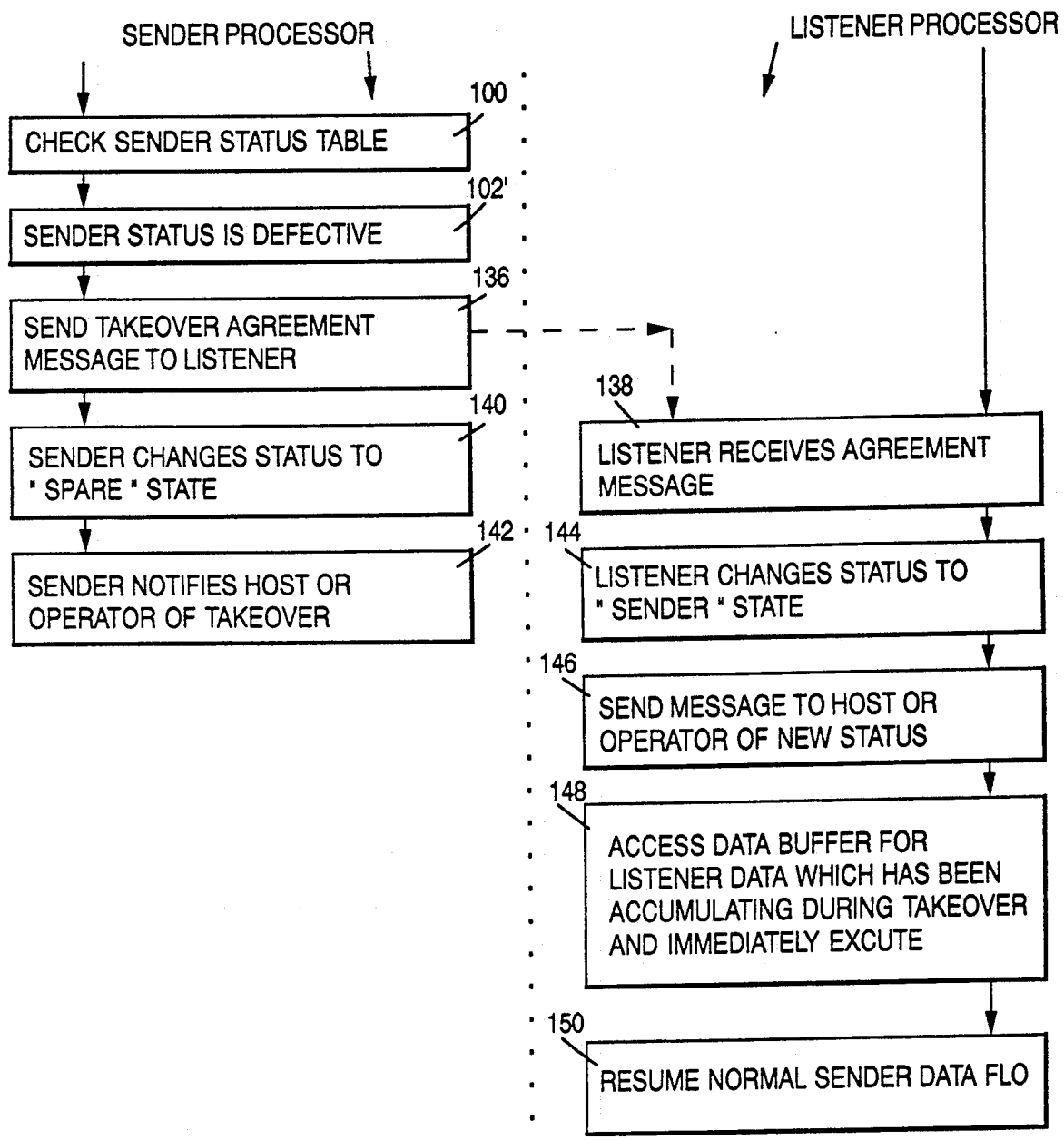

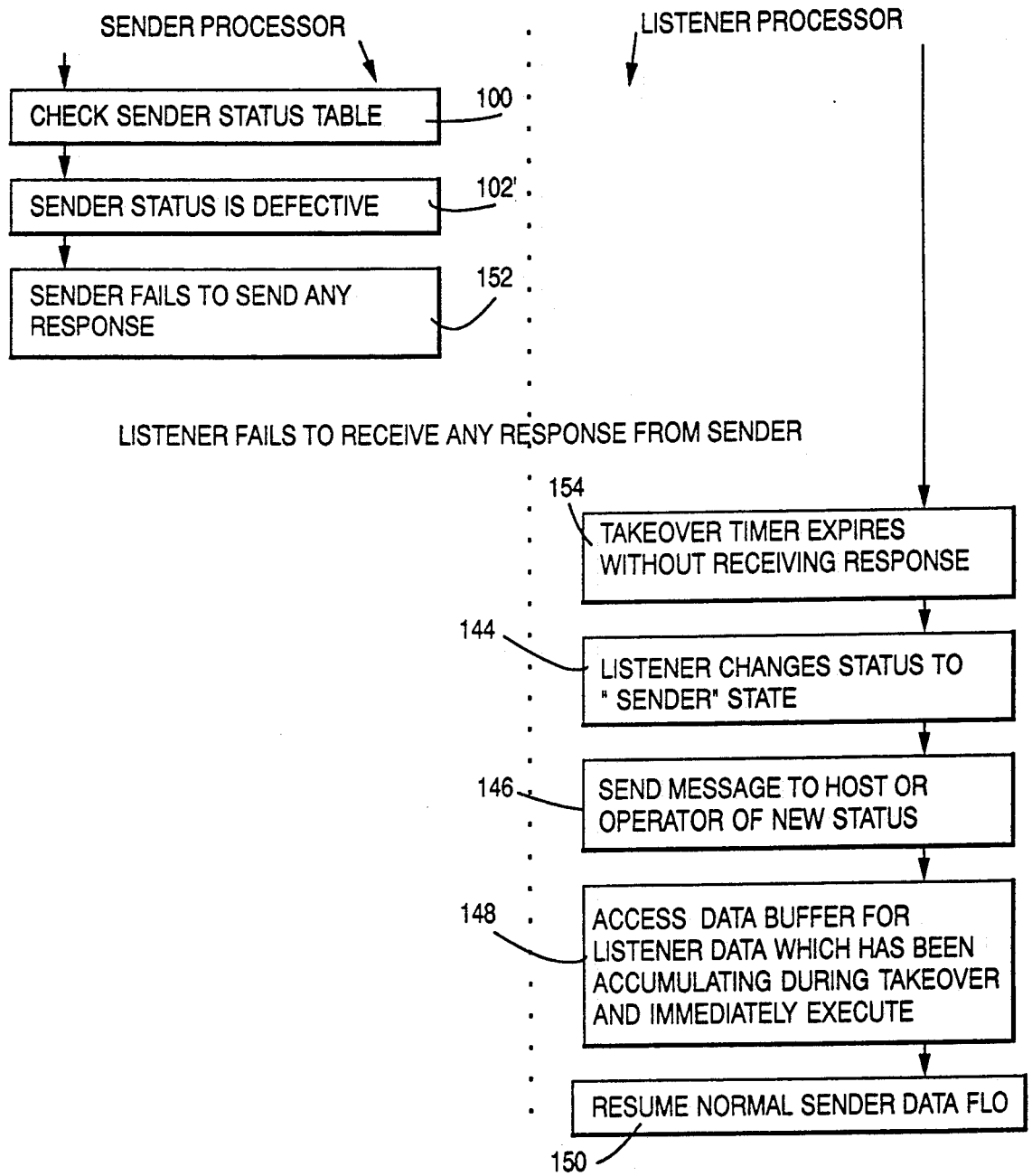

REAL TIME, FAIL SAFE PROCESS CONTROL SYSTEM AND METHOD

BACKGROUND OF THE INVENTION

1. Technical Field

The invention disclosed broadly relates to computer architectures, and more particularly relates to real time control system architectures which include fail safe features.

2. Background Art

Real time control applications such as process control in a factory environment, scheduling traffic in transportation networks or scheduling and controlling operations in broadcast communications networks, require a high reliability for the controlling processor. The prior art has provided high reliability systems by employing redundant processors in a fail safe configuration wherein a first processor is the primary or active processor which provides actual control commands to the system being controlled and the system further includes a second or standby processor which monitors the operation of the active processor and is ready to take over primary operations in the event that a failure is detected in the active processor. This technique is called hot standby redundant processing. A typical prior art approach to monitoring the active processor in a hot standby redundant processing system is by the use of a shared disk drive between the active processor and the standby processor. The active processor will periodically write a status word onto the shared disk drive and the standby processor will read the status information and interpret whether the primary continues to operate as intended. The standby will not take over the active status unless it determines from the status information on the shared disk drive that the active processor is malfunctioning. One problem with this prior art approach to a hot standby redundant operation is the seek time necessary to write the information onto the disk drive by the active processor and then to read the information from the disk drive by the standby processor. This time interval may be long enough to interfere with the smooth switchover which may be required in some applications when the standby processor takes over the active operation.

Another feature which is desirable in a real time control system is the capability of adapting to unscheduled changes such as responding to emergency situations in a process control application or responding to unscheduled broadcast events such as a news flash in a broadcast network control application. A typical prior art approach to real time adaptation in a hot standby redundant processor system would have the control sequence in the active processor altered by the real time information change but no change would be made to the standby. In such an architecture, when the standby later detects a fault in the active processor's operation, the standby would have to go through a data load interval to load the most recent data into its own respective memory before it could take over and resume the operation currently being controlled by the abdicating active processor. This would impose still further delay in the switchover time for the takeover by the standby in a prior art hot standby architecture.

Additional features which are required in a real time control system for the sequential scheduling of events, is the ability to frame accurate schedule execution. Prior art systems have been unable to meet this requirement where relatively short hot standby takeover intervals are required. Another feature of real time control systems which must control complex networks of machines is the ability to expand the number and kinds of slave machines connected and under control of the real time processors. Rapidly changing the configuration of prior art real time control systems has been a significant problem requiring a lengthy reprogramming in order to expand existing systems.

OBJECTS OF THE INVENTION

It is therefore an object of the invention to provide an improved real time control system architecture.

It is another object of the invention to provide an improved real time control system architecture which includes a hot standby redundant processor feature which is capable of faster switchover, than has been available in the prior art.

It is another object of the invention to provide an improved real time control system architecture having a hot standby redundant processor feature, which is capable of updating the hot standby processor in real time so that it is able to take over active control in a faster manner than has been available in the prior art.

It is therefore another object of the invention to provide an improved real time control system architecture which is capable of framing accurate schedule execution sequences.

It is yet a further object of the invention to provide an improved real time control system architecture which is capable of significant expansion in a flexible and easily implemented manner.

SUMMARY OF THE INVENTION

These and other objects, features and advantages of the invention are accomplished by the real time control system architecture disclosed herein. A real time control system is disclosed for controlling the sequential execution of scheduled operations such as in process control or broadcast scheduling applications. The system uses a fail safe feature characterized as a sender/listener architecture. An external clock input to the sender and the listener assures synchronous sequential stepping through identical schedules stored in each processor. Under normal operation, the sender processor controls the execution of events as they are sent from a host computer connected to the system. Unscheduled events or errors are processed by being added to the schedule in real time for both the sender and listener processors. The listener processor monitors the sender's signaling in the controlled network and, in the case of a failure in the sender, the listener immediately assumes control of the system as the new sender. The listener executes commands which were omitted by the failing sender during the takeover interval and it then resumes the originally intended schedule of process control events.

BRIEF DESCRIPTION OF THE DRAWINGS

These and other objects, features and advantages of the invention will be more fully appreciated with reference to the accompanying figures.

FIG. 3, consisting of FIGS. 3A and 3B, is a flow diagram of the normal operation of the sender processor and the listener processor.

DESCRIPTION OF THE BEST MODE FOR CARRYING OUT THE INVENTION

Figure 1:
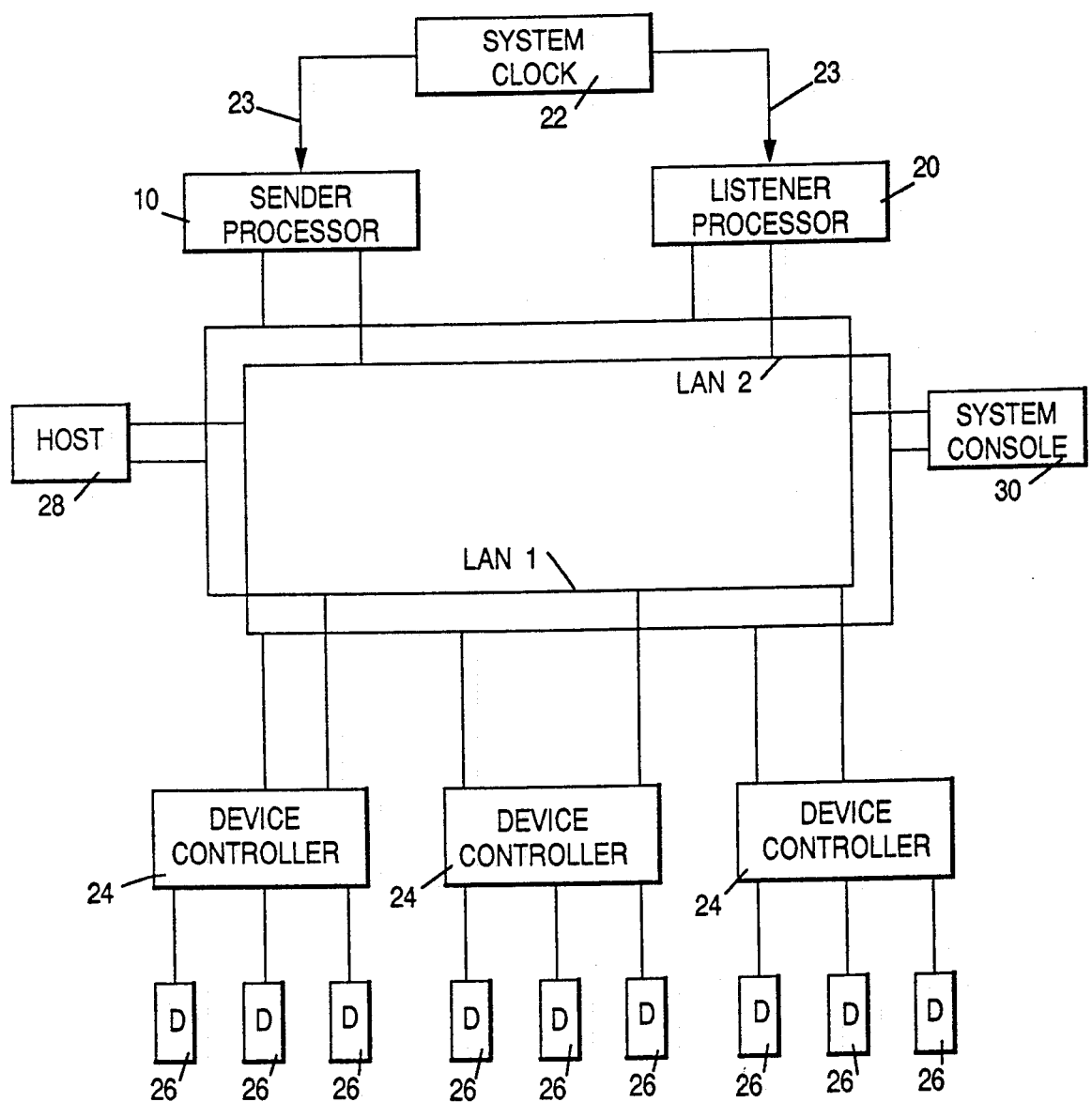
FIG. 1 is an overall architectural diagram of the real time fail safe process control system.

The real time, fail safe process control system is shown in overall block diagram in FIG. 1. The system is designed for performing real time process control applications such as in the scheduling of traffic in a transportation network, the scheduling of message transmissions in communications networks, the scheduling of broadcasting events in a broadcast network, and the like. These applications have a common feature of prespecified sequences of events which are to be performed as specified in a predefined schedule. However, to adapt the system for modification in the face of real time changes in the events to be executed, rapid rescheduling of the events in a sequence is necessary. Since most real time process control applications require a high reliability and availability for the processing system, a fail safe, hot standby redundant processor arrangement is provided. At least two processors, the sender processor 10 and the listener processor 20 are connected in the local area network consisting of at least the LAN1 to one or more devices 26 to be controlled. In the preferred embodiment, a dual local area network arrangement consisting of the LAN1 and the LAN2 are used as redundant, parallel communications links between the processors 10 and 20 and the devices to be controlled, 26. Typically, the devices 26 which are to be controlled are managed by device controllers 24 through which the devices 26 are connected to the local area networks LAN1 and LAN2. A host processor 28 also connected to the dual local area networks LAN1 and LAN2, provides prestored schedules of events to be executed to the sender processor 10 and the listener processor 20. A system console 30 also connected to the local area networks LAN1 and LAN2, enables an operator to provide real time updates and to monitor the operation of the system. A system clock 22 is connected over lines 23 to the sender processor 10 and the listener processor 20 to guarantee that both processors operate synchronously, as will be described below.

Figure 2:
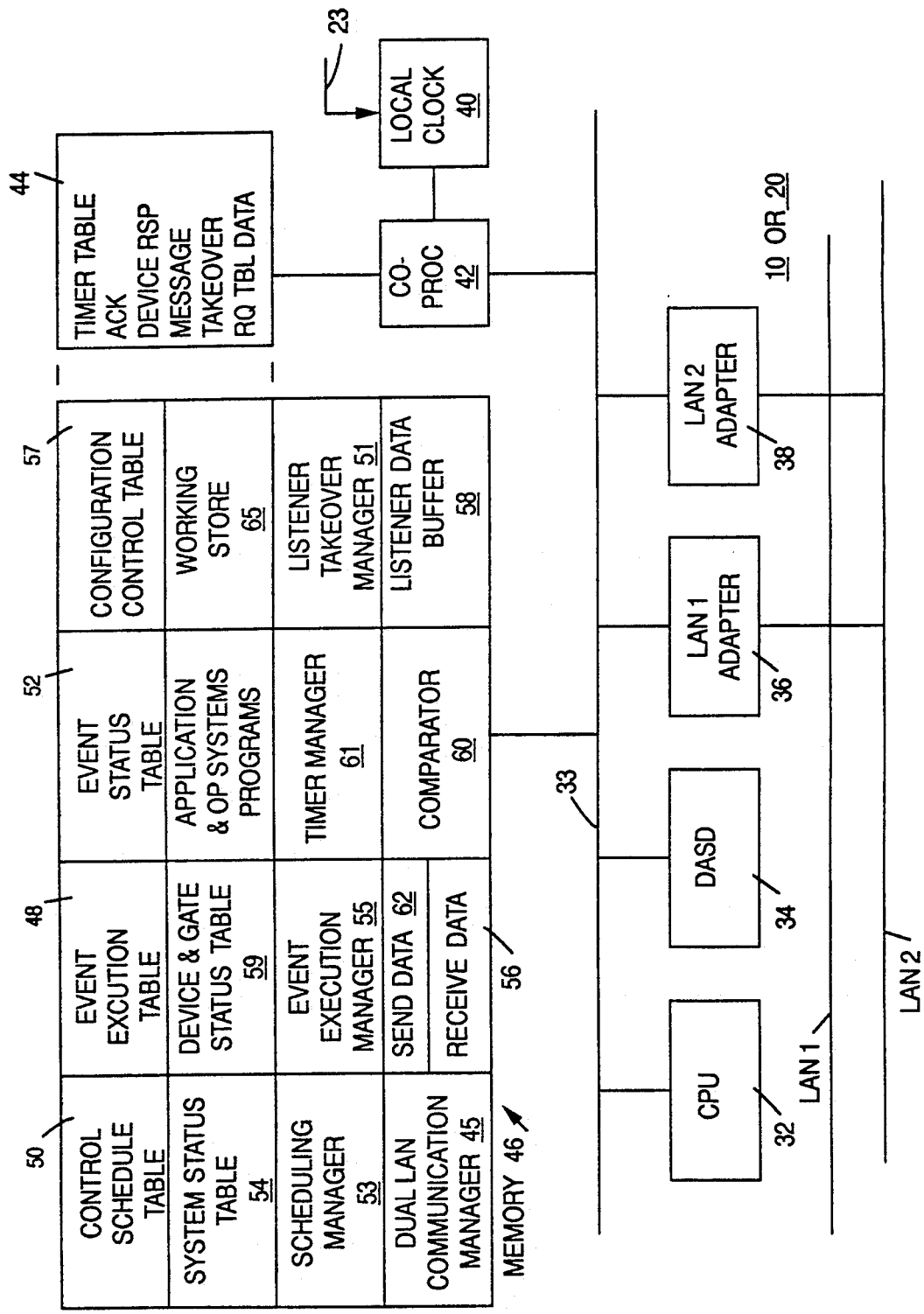
FIG. 2 is a more detailed functional block diagram of the sender processor 10 or the listener processor 20.

FIG. 2 is a more detailed functional block diagram of the sender processor 10 or the listener processor 20, both of which are identical in their hardware and software configurations. The processor 10, for example, includes a processor bus 33 to which is connected a central processing unit (CPU) 32, a magnetic storage DASD 34, a LAN1 adapter 36 which is connected to the LAN1, the LAN2 adapter 38 which is connected to the LAN2, and a programmable timer consisting of a co-processor 42 having an input connected to the local clock 40. The local clock 40 has a synchronizing clock input 23 connected to the system clock 22. The co-processor 42 manages the timer table 44 using the timer manager 61, which provides programmable timing which is essential to the operation of the processor 10. The memory 46 connected to the bus 33 stores a plurality of scheduling and execution tables as well as the various software modules necessary to execute the method of the invention.

The sender and listener mode of operation uses the sender processor 10 to issue control information to the device controllers 24 over the local area network LAN1 and LAN2, at predefined times while the listener processor 20 monitors the sender, insuring that the messages are sent at the specified time. In the event of a failure of the sender, the listener negotiates with the sender to determine if a takeover is required by the listener processor 20. The memory 46 in both the sender processor 10 and the listener processor 20 includes the event execution table 48, the control schedule table 50, the event status table 52, as well as the timer table 44. The organization of these tables is shown in Table 1 herein. The primary function of the sender processor 10 is to process the control schedule table which specifies the events which are to be executed in the controlled process. The listener processor 20 synchronously processes an identical table and then saves the results of that processing for comparison with the control messages output by the sender processor 10. The control schedule table 50 contains the time sequenced activities which must be processed by the sender according to a predefined schedule. In addition, the sender processor 10 must also process real time interrupts such as changes in the schedule of events sent from the host processor 28, external cue signals, device controller error messages, and takeover requests from the listener processor 20. The sender processor 10 also generates a status message called a heartbeat which is transmitted to either the host processor 28 or the system console 30 in a periodic manner, to give a positive indication that the sender processor 10 is operational. Both the sender processor 10 and the listener processor 20 keep their clocks 40 synchronized through the use of the system clock 22 over lines 23. The local clock 40, co-processor 42 and timer table 44 are a real time interface co-processor which provides programmable timing intervals for use in the operation of the method of the invention. The listener processor 20 monitors the sender processor 10 for all functions and the listener processor 20 maintains a duplicate configuration in its memory 46 ready to take over control of the system in the event of a failure of the sender processor 10.

The sender processor 10 and the listener processor 20 have the same software program modules in their memories 46, however they may follow different execution paths at particular instances depending upon the particular state of the application being processed by the sender processor 10 and the listener processor 20.

Figure 7:
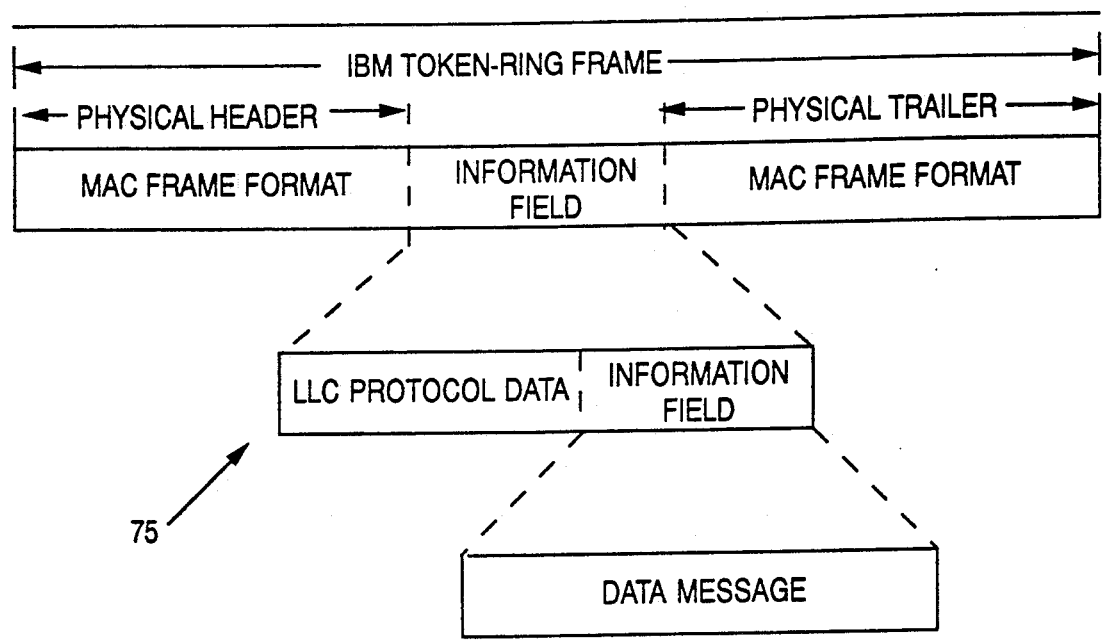
FIG. 7 is a generalized diagram of the format of a control message output by either the sender processor or the listener processor onto the LAN.

The system of FIG. 1 uses a token ring local area network as LAN1 and a duplicate token ring LAN network as LAN2. LAN1 and LAN2 are operated in parallel for enhanced fail safe redundancy. The token ring LAN permits any-to-any communication between all processors and all device controllers connected thereto. The dual LAN configuration of LAN1 and LAN2 improves reliability of the system through the use of duplicate message processing. The token ring LAN used for LAN1 and LAN2 is described in greater detail in the "IBM Token Ring Network Architecture Reference," *IBM Manual No. SC* 30-3374-01, and is based upon the *IEEE Standard for Token Ring Networks,* 802.2 *and* 802.5. An example of an IBM token ring frame format is shown in FIG. 7.

When the listener processor 20 detects that the sender processor 10 is operating improperly, by monitoring the messages transmitted over the local area network LAN1 and/or LAN2, the listener processor 20 will issue a takeover request over the local area network to the sender processor 10. The sender processor 10 will then evaluate the request and determine whether a takeover is necessary, by inspecting its system status table 54 in its memory 46. If the sender processor 10 determines that a takeover is necessary, it will notify the listener processor 20 by an agreement message sent over the local area network LAN1 and/or LAN2. When the listener processor 20 is notified by the sender of the agreement for a takeover, then the listener begins takeover processing. Alternately, if the listener receives no response from the sender processor 10 after a predefined time interval, the takeover processing will begin automatically by the listener processor 20. Alternately, if the sender processor 10 denies the takeover request made by the listener processor 20, the listener processor 20 will then assume that its control schedule table 50 is in error and it will request the sender processor 10 to send a copy of the system files to the listener processor 20 in order to resynchronize the listener with the sender.

If a sender processor 10 or the listener processor 20 receives a message over only one LAN, either LAN1 or LAN2, it will process the message as if it were received over both of the LANs, LAN1 and LAN2, and it will note that there is an apparent fault on the noncommunicating LAN. The device controllers 24 also receive messages over both LANs, LAN1 and LAN2, and if a device controller 24 receives a message over only one LAN, it will process the message as if the message were received over both LANs. The controller will then ignore the delayed, duplicate message received over the second LAN, if it is received. In this manner, if a soft error occurs in one of the LANs, either LAN1 or LAN2, the system will continue running using the second, operative LAN.

Several of the more important data tables contained in the memory 46 of FIG. 2 will now be described. The control schedule table 50 contains the table data sent from the host processor 28 to both the sender processor 10 and the listener processor 20. The control schedule table 50 is the main depository for scheduled control messages to be sent to the device controllers 24 by the sender processor 10 and the listener processor 20.

The event execution table 48 acts as the index into the control schedule table 50. It contains the earliest absolute start time for a sequence of events which are grouped into a class. A class typically includes several events which are naturally executed in a sequence in order to accomplish a function. Each entry in the event execution table contains the earliest absolute start time for an event in a class and an address pointer to the location of that first occurring event in the control schedule table 50. Periodically, the event execution table is scanned by the scheduling manager process and the event information for the classes which must be scheduled in the near future is identified. Each entry in the event execution table also includes a class flag to maintain the status of the class as being either not started, started, completed or halted. During its periodic scan, entries for those classes which have been completed are deleted from the table. Table 1, herein, illustrates the organization of the event execution table 48.

The event status table 52 contains status information used in processing each event in the control schedule table. Entries in the event status table are created by the scheduling manager process 53 when events are scheduled for execution. Status fields are updated when event status is received. Event status can be "not scheduled", "scheduled", "message sent", "acknowledgement received", "device response received", or "halted". In addition, a completion code indicates whether the execution of the event is completed and whether a soft or hard failure has been detected. The organization of the event status table 52 is shown in Table 1 herein.

The timer table 44 is used to maintain information about time intervals which have been started by various application processes. When an application requests that a timer be started, an entry is made in the timer table 44. Periodically, the execution times entered into the table are checked against the current time on the local clock 40 to determine which time intervals have expired. This operation is managed by the co-processor 44 using the timer manager 61, which provides an interrupt to the CPU 32 when a particular timeout has been reached. The organization of the timer table 44 is shown in Table 1 herein.

Each processor, the sender processor 10 and the listener processor 20 contains a system status table 54 which provides state data determining the current operational condition of the processor. It includes the status of the co-processor 42, the token ring LAN adapters 36 and 38, the status of application program-to-program communications sessions between the processor and the host 28, the status of the DASD 34, and other hardware and software associated with the processors 10 and 20. All of these status indications are summarized in a single binary status indicating the operational health of the processor. It is this system status table 54 which is consulted by the sender processor 10 in response to a takeover request by the listener processor 20.

The memory 46 also includes the configuration control table 57 which specifies the hardware connected in the system including the sender and the listener ID, and the types and IDs of the device controllers and devices in the network. This contributes to the flexibility in the configuration of the system since the configuration control table 57 can be redefined from the host processor 28 or the system console 30, to include additional reserve listener processors, additional device controllers and additional controlled devices. The device and gate status table 59 keeps track of the operational status of the various devices and gates in the networks. Additional application programs and operating system software is included in the memory 46 to perform supporting operations. A working store 65 is included in the memory 46.

The normal sequence of operations for the sender processor 10 and the listener processor 20 can be more fully appreciated with reference to the flow diagram of FIG. 3. An understanding of the operation can be facilitated with an example. The example chosen is that shown in Table 2 for the application of the system and method of the invention to the process control of an automated drilling machine. The automated drilling machine can be considered one of the devices 26 in the system block diagram of FIG. 1. The host processor 28 has downloaded over the local area network LAN1 and/or LAN2 the data tables which include the control schedule table 50. Control schedule table 50 is received by both the sender processor 10 and the listener processor 20 and from the information contained therein, the event execution table can be constructed as shown in Table 2. Three process classes have been communicated in the control schedule table; a first class 23 consists of a linked list of five events which sequentially position the workpiece, rotate the turret of the drilling machine, engage the cutter of the drilling machine to the workpiece, advance the cutter in the X direction, and then disengage the cutter. The second class is identified as class 14 and consists of a single event of ejecting the workpiece. A third class which is identified as class 16, consists of a single event of repositioning the workpiece. The initial setup of the event execution table 48 consists of two sequential classes, the first class 23 and then the second class 14 of ejecting the workpiece. As the local clock 40 approaches the time of the earliest event of 10 hours, 29 minutes and 30 seconds, the first class 23 is initialized in the event status table 52 so that the scheduling of the time intervals associated with the events therein can be entered into the timer table 44. The timeout values entered into the timer table 44 can be seen in the example shown in Table 2. A one millisecond timeout is entered in the listener processor 20 in the timer table 44 for the timeout interval to receive the message from the sender processor 10. In addition, a 10 millisecond timeout is set to receive the acknowledgement from the device controller 24. In addition, a 100 millisecond timeout is set to receive a device response signal from the device 26.

In FIG. 3, in a normal operation of the sender processor 10 and the listener processor 20, the timer table 44 times out to identify the next task to process in step 64 for the sender processor 10 and step 64' for the listener processor 20. Task execution then starts in both processors, an acknowledgement timer is started in both processors, and a device response timer is started in both processors, as can be seen in the timer table 44 of the example in Table 2. In addition, the sender message timer in step 66 is started by the listener processor 20, to time out a one millisecond timeout interval for the receipt of the message from the sender processor 10. In FIG. 3, case A, is the normal operation. The sender data is ready in the sender processor 10 and is passed to the LAN task performed by the dual LAN communication manager 45 and then the command message is sent out on both LAN1 and LAN2 in step 72. Then the processor 10 waits for the acknowledgement signal from the device controller in step 80. In the listener processor 20, the task has the listener data ready which is a duplicate of the sender data which was prepared in the sender processor 10. In the listener processor 20, the listener data is then loaded into the listener data buffer 58 but it is not sent out on the LAN. The listener processor 20 then waits to receive the message from the sender processor 10 on either LAN1 or LAN2 or both. In step 74, the listener processor 20 receives the command message on either LAN1 or LAN2, which was sent by the sender processor 10. The received message is stored in the receive data buffer 56 of the listener processor 20. The data is checked to determine that it is a command message and then in step 76, the data received from the sender processor 10 and now present in the receive data buffer 56 is compared by the comparator 60 with the data stored in the listener data buffer 58. A check is made to determine if both data have the same sequence number. If the data in the listener data buffer 58 compares with the data from the sender processor 10 in the receive data buffer 56, then the sender message timer in the timer table 44 is canceled in step 78 and the listener processor 20 then waits for the acknowledgement signal from the device controller 24 in step 80'. The device controller 24 responds to the receipt of the control message from the sender processor 10 by outputting an acknowledgement message on the LAN1 and the LAN2. In the specific embodiment disclosed herein, the IBM token ring network has a special group address called the functional address. This is a special form of the IEEE 802.5 group address. It is by the use of this addressing technique and the source access point address (SAP) of the IBM token ring architecture and the IEEE 802.2 convention, that the sender and the listener are able to communicate with one another and to receive acknowledgement signals from the device controllers 24. Both the functional address as well as the SAP address are used for a unique message header to allow the applications to respond with acknowledgement signals. The lower level protocol IEEE 802.2 convention normally does not guarantee that a response can be made. But by virtue of receiving and echoing back the frame using a control field in the unique message, the controllers 24 are able to send an acknowledgement signal back to the sender processor 10 and the listener processor 20.

In FIG. 3, step 82 for sender processor 10 and step 82' for the listener processor 20 receive the acknowledgement signal, check the received signal and then cancel the acknowledgement timer in the timer table 44. Then both the sender processor 10 and the listener processor 20 wait for a response signal from the device 26. In step 84 for the sender processor 10 and step 84' for the listener processor 20, the device response is received and checked and then the device response timer is canceled in the timer table 44. In this example of the normal operation for the sender processor 10, the response data is then passed to the device response task in step 86. Similarly, in the listener processor 20, the response data is passed to the device response task in step 86'.

Table 3 herein gives an illustration of a real time update of the next scheduled class. In the example of Table 2, when class 23 is started at the time 10 hours, 29 minutes and 30 seconds, the next class to be scheduled is class 14 which will function to eject the workpiece at the drilling machine. At a time before 10 hours, 30 minutes and 0 seconds when class 14 is to be started, it can be modified in real time from the host processor 22 and this is the operation illustrated in Table 3 herein. The host processor 22 downloads a new class, class 16 which is transmitted over the LAN1 and LAN2 to the sender processor 10 and the listener processor 20, to be entered in the event execution table 48 and to substitute for the existing class 14. The classes in the event execution table 48 are organized in a time sequential manner by a linked list. The real time update of the event execution table 48 in Table 3 is accomplished by opening the linked list at the class 14 and rerouting the linked list to the class 16 entry, effectively omitting class 14 from the event execution table 48. If the events in class 16 were not already present in the control schedule table 50, they would also be downloaded from the host 22 at this time. The real time updating of the schedule to be executed can be performed at any time prior to the earliest start time of events in the class to be changed in the control schedule table 50. In this manner, real time updating of the schedule to be executed can be accomplished. This updating process is performed in parallel in both the sender processor 10 and the listener processor 20. The resulting data tables at the time 10 hours, 29 minutes, 32 seconds showing the real time update for the next scheduled class is shown in Table 3 for both the sender processor 10 and the listener processor 20.

Figure 4C:
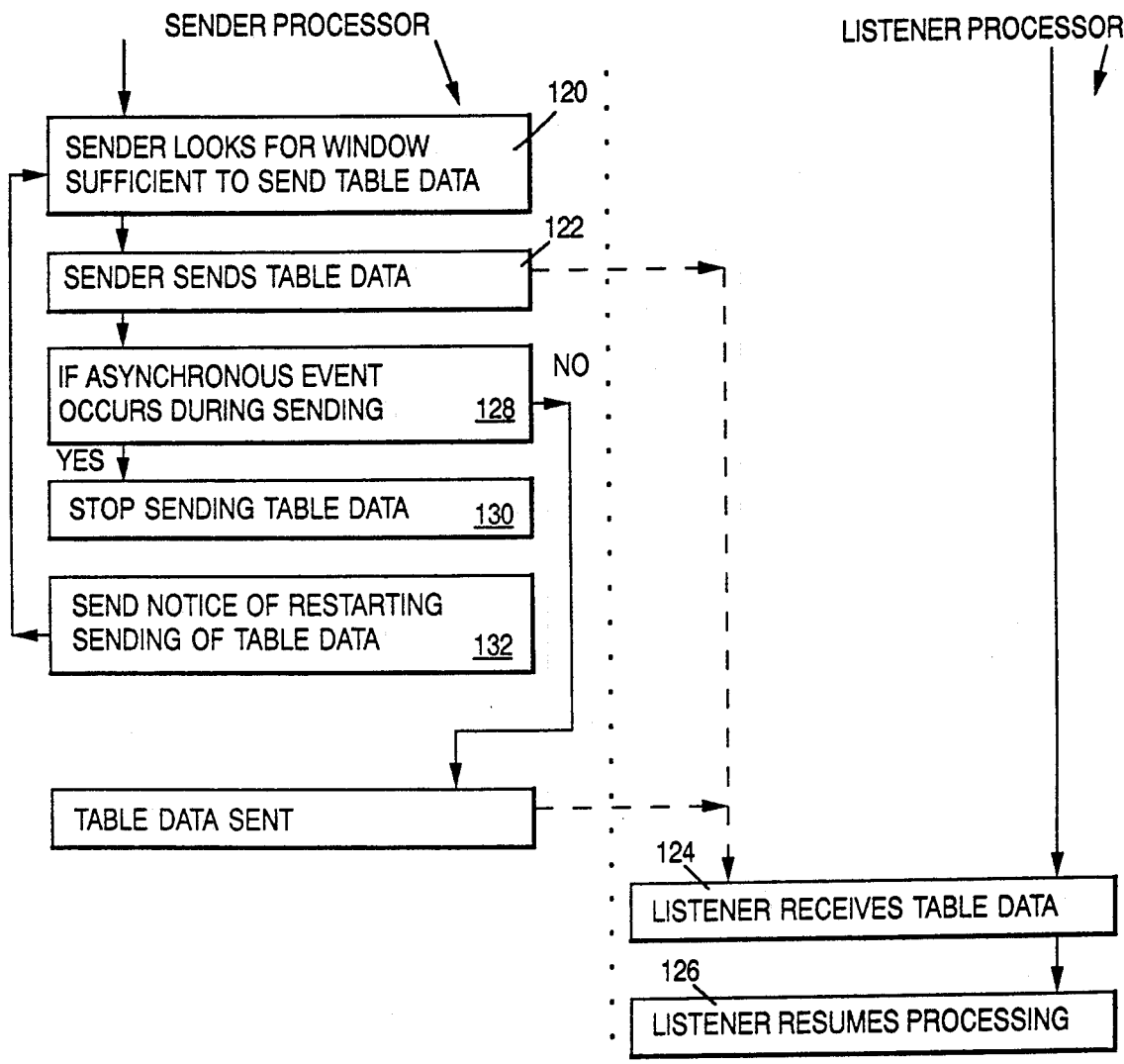
FIG. 4, consisting of FIGS. 4A, 4B and 4C, is a flow diagram of the sender processor and the listener processor operation when the listener fails to receive command messages sent by the sender.
Figure 4:
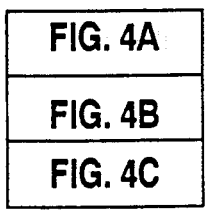
Figure 4A:
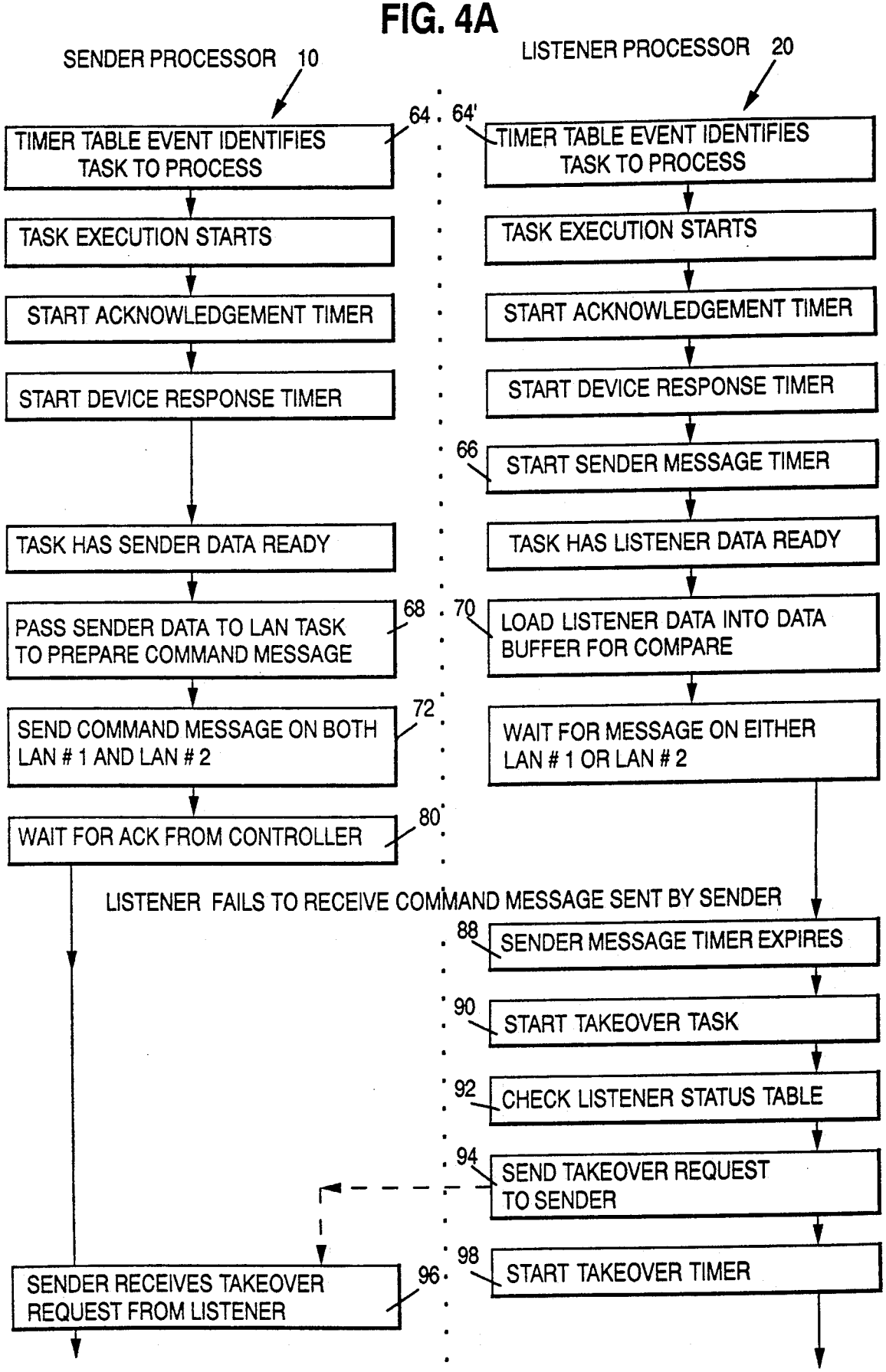
Figure 4B:
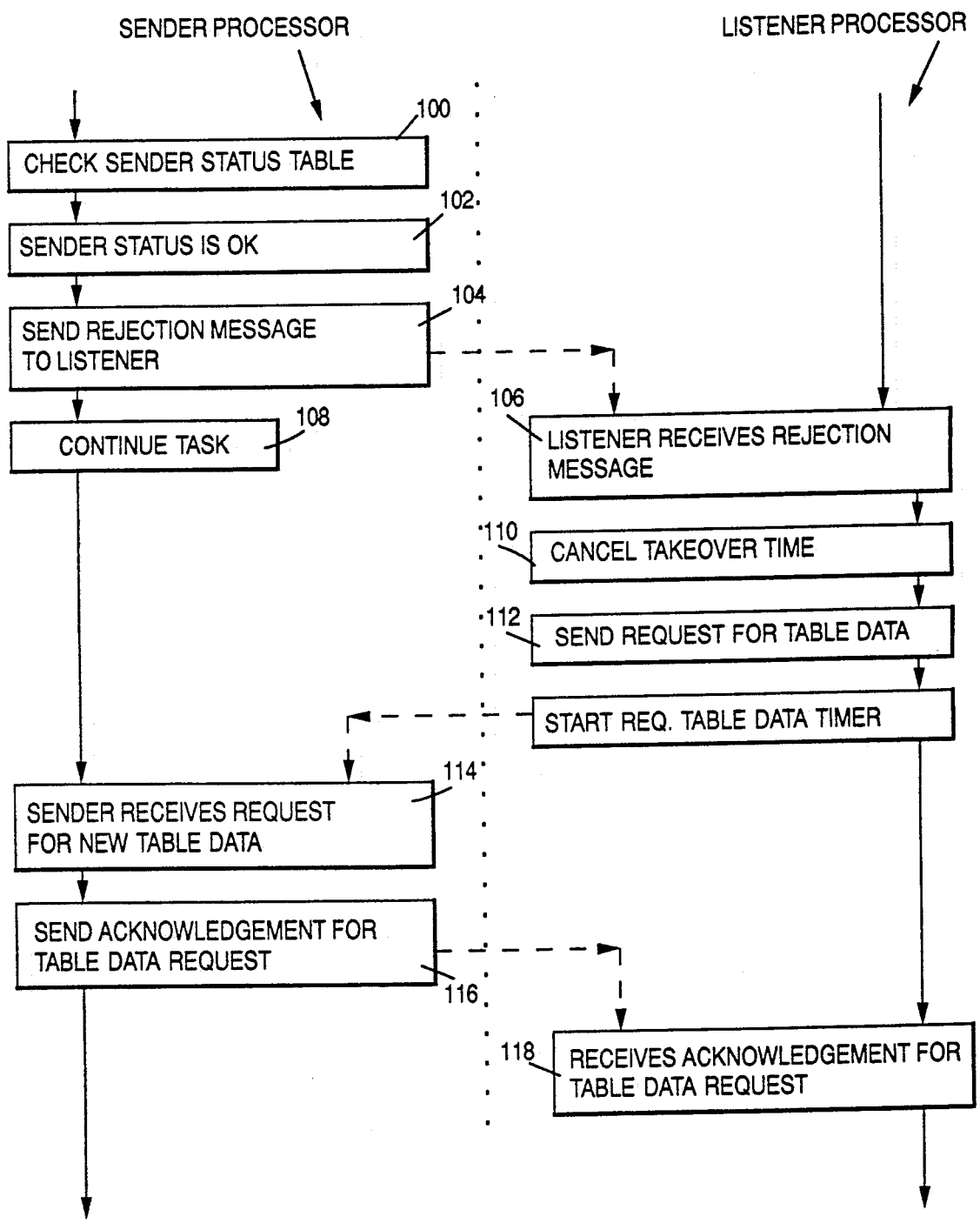

Reference to FIG. 4 will illustrate case B for the operation of the sender processor 10 and the listener processor 20 when the listener fails to receive a command message sent by the sender due to the failure of a listener. The sequence of steps in the sender processor 10 from step 64 through step 80 is the same as that described for the normal operation in FIG. 3. Similarly, the sequence of steps in the listener processor 20 from step 64' to step 70 and the waiting for the message on either LAN1 or LAN2 is the same as in FIG. 4 as it was in FIG. 3. As is shown in FIG. 4, through failure of the listener to receive a command message sent by the sender, the sender message timer expires in the listener timer table in step 88. Thus, the listener takeover manager 51 in the listener processor 20 starts the takeover task in step 90 by checking the listener status table 54 in step 92 and then sending a takeover request in step 94 to the sender processor 10 over the LAN1 and LAN2. The sender receives the takeover request from the listener in step 96. The sender then checks its system status table 54 in step 102. Since there are no failures indicated in the system status table 54, the sender sends a rejection message to the listener in step 104. The rejection message which passes over the LAN1 and LAN2 is received by the listener in step 106 of the listener processor 20. When the listener receives a rejection message, the listener cancels the takeover timer in step 110 which was started in step 98, and then the listener requests a new copy of the data tables be sent by the sender in the listener step 112. In the sender processor step 114, the sender receives the request for a new data table and acknowledges that request in step 116, that acknowledgement being received by the listener in step 118. The sender then proceeds in step 120 to prepare the data tables for transmission to the listener processor 20 and the sender looks for a time window of sufficient width to enable sending the data tables to the listener. The sender then sends the data tables in step 122 and the data tables are received by the listener in the listener step 124. If the listener has received the entire new copy of the data tables from the sender, then the listener resumes normal processing in step 126, monitoring the operations of the sender processor 10.

If, during the course of step 122 as the sender is sending the data tables over the LAN1 and LAN2, if an asynchronous external event occurs such as an error message or other asynchronous event in step 128, then the sender processor stops sending the data tables in step 130 and sends a notice to the listener processor that transmission of the data tables will be restarted from the beginning in step 132. The process in the sender processor then loops back to step 120, the sender now looking for a sufficient window to send a copy of the data tables. Once a full copy of the data tables is successfully sent to the listener processor 20, the listener will resume normal processing in step 126.

Figure 5A:
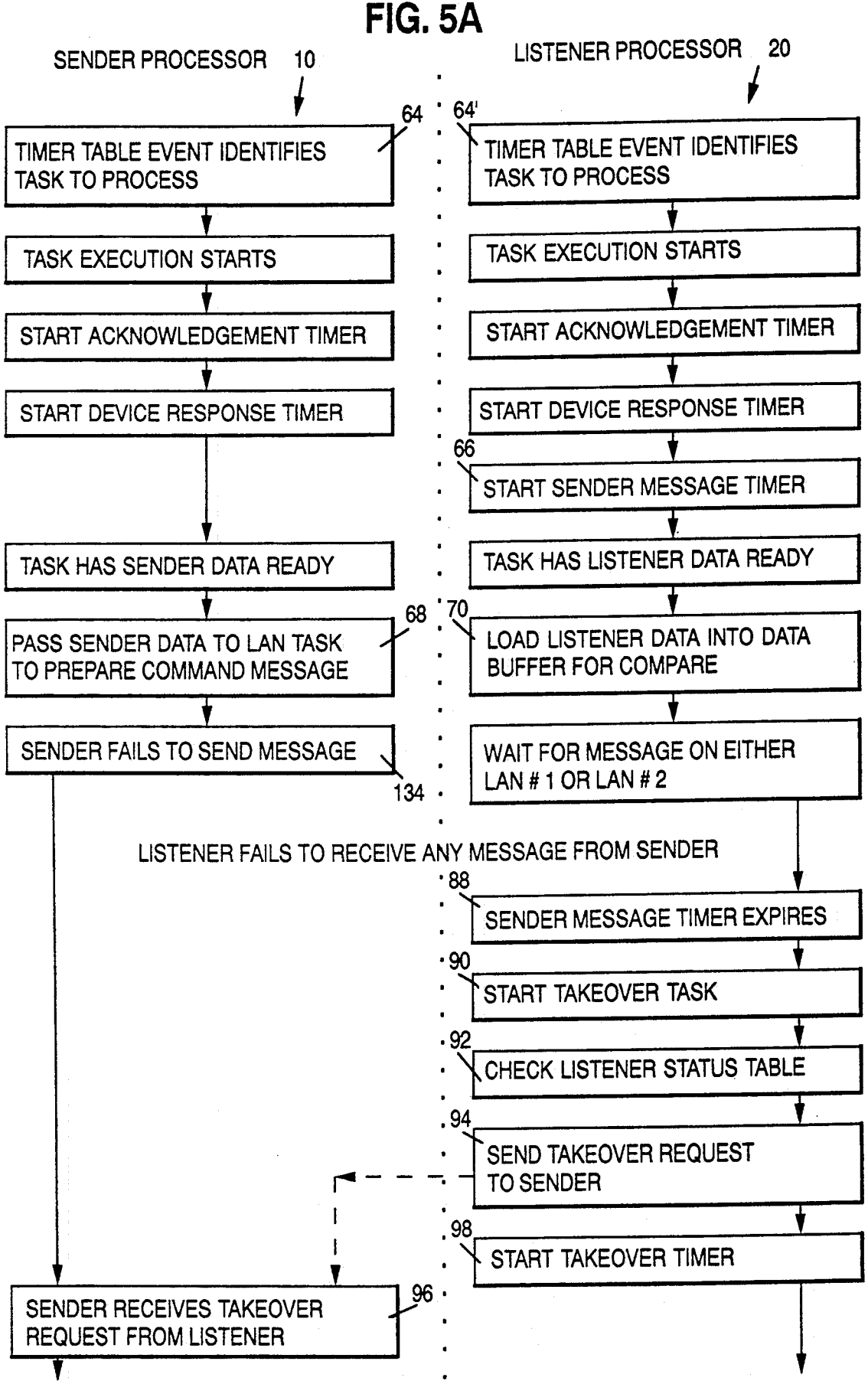
FIG. 5, consisting of FIGS. 5A and 5B, is a flow diagram of the sender processor and the listener processor for the operation when the sender processor fails to send the scheduled message, resulting in a negotiated takeover by the listener.

Reference to FIG. 5 will illustrate the sequence of operational steps in the sender processor 10 and the listener processor 20 for case C where the sender processor fails to send a scheduled message and this results in the negotiated takeover by the listener. In FIG. 5, steps 64 through 68 of the sender processor 10 are the same as those described for FIG. 3. Similarly, steps 64' through 70 for the listener processor 20 are the same as those described for FIG. 3. Reference can be made to Table 4 herein which shows the time sequence of events which occur during the takeover by the listener due to the sender failure at the time of 10 hours, 29 minutes and 32 seconds in the example. At the time of 10 hours, 29 minutes and 30 seconds, it can be seen that the sender's status table 54 indicates it is "OK" and that the sender has transmitted the control message 2300 to position the workpiece. This can be seen since it has been received in the listener's receive data buffer 56. The listener processor 20 has also generated the control message 2300 which is placed in the listener data buffer 58. Also shown in Table 4, five milliseconds later, the acknowledgement signal is received in the listener's receive data buffer 56 and 50 milliseconds later, the device response signal is received in the listener's receive data buffer 56.

In Table 4 at the time 10 hours, 29 minutes, 32 seconds, when the listener data buffer 58 has generated the second event message 2301 to rotate the turret, no corresponding message has been received over the LAN1 or LAN2 from the sender processor 10 as indicated by the empty contents of the listener's receive data buffer 56. This indicates a sender failure which is inferred by the listener processor 20. The listener processor then initiates the takeover request in step 94 of FIG. 5. The takeover request is transmitted over the LAN1 and LAN2 to the sender processor 20 where it is received in step 96. The listener processor, in the meantime, has started the takeover timer 98. As can be seen in FIG. 5, the sender processor 10 checks the sender status table 54 in step 100 and determines that the sender status is defective as can be seen in step 102'. This can also be seen in Table 4 under the sender's status table 54 column. The sender, processor 10 then sends a takeover agreement message in step 136 to the listener processor 20. This agreement message is transmitted over LAN1 and LAN2 to the listener processor 20 and is received in step 138. In response to this, the listener processor in step 144 changes its status to a "sender" state and then in step 146 it sends a message to either the host processor 28 or the control console 30 indicating its new status. The listener processor 20, now in the "sender" state, accesses the listener data buffer 58 which has been accumulating control messages generated within the listener processor 20 during the interval required to accomplish the takeover. Reference to Table 4 will illustrate this circumstance. At the time 10 hours, 29 minutes, 32 seconds, control message 2301 to rotate the turret was generated by the listener processor 20. Five hundred milliseconds later, control message 2302 is generated to engage the cutter. Still later at 10 hours, 29 minutes and 33 seconds, control message 2303 was generated to advance the cutter. These three messages 2301, 2302 and 2303 were generated within the listener processor 20 and were accumulated in the listener data buffer 58.

At the time 10 hours, 29 minutes, 33 seconds, the listener processor 20 has completed changing its status to the "sender" state in step 144, and now starts accessing the contents of the listener data buffer 58 for the control messages which have been accumulating therein but which have not been transmitted over the LAN network to the device controller 24 and the device 26. As is shown in Table 4, at 10 hours, 29 minutes and 33 seconds, the message 2301 to rotate the turret is transmitted through the listener's send data buffer 62 out onto the LAN1 and LAN2. This is followed by the receipt of an acknowledgement signal within five milliseconds and the receipt of the device response signal within 50 milliseconds from the device controller as is shown in Table 4. Then the listener data buffer 58 is accessed and message 2302 is output through the listener's send data buffer 62 onto the LAN network. This is followed by the receipt of the acknowledgement signal within five milliseconds and receipt of the device response signal within 50 milliseconds. The listener processor 20 then accesses the listener data buffer 58 for the message 2303 which is then output through the listener's send data buffer 62 onto the LAN network. This is followed by the receipt of an acknowledgement signal within five milliseconds and the receipt of a device response signal within 50 milliseconds.

Then, as can be seen in Table 4, at 10 hours, 29 minutes and 35 seconds, the listener data buffer 58 no longer has delayed messages which have been accumulated during takeover interval, and now has a currently generated message 2304 to disengage the cutter. This message is output through the listener's send data buffer 62 onto the LAN network. The listener is now transmitting messages on the originally intended schedule and thus resumes normal sender data flow in step 150 as is shown in FIG. 5.

Figure 6A:
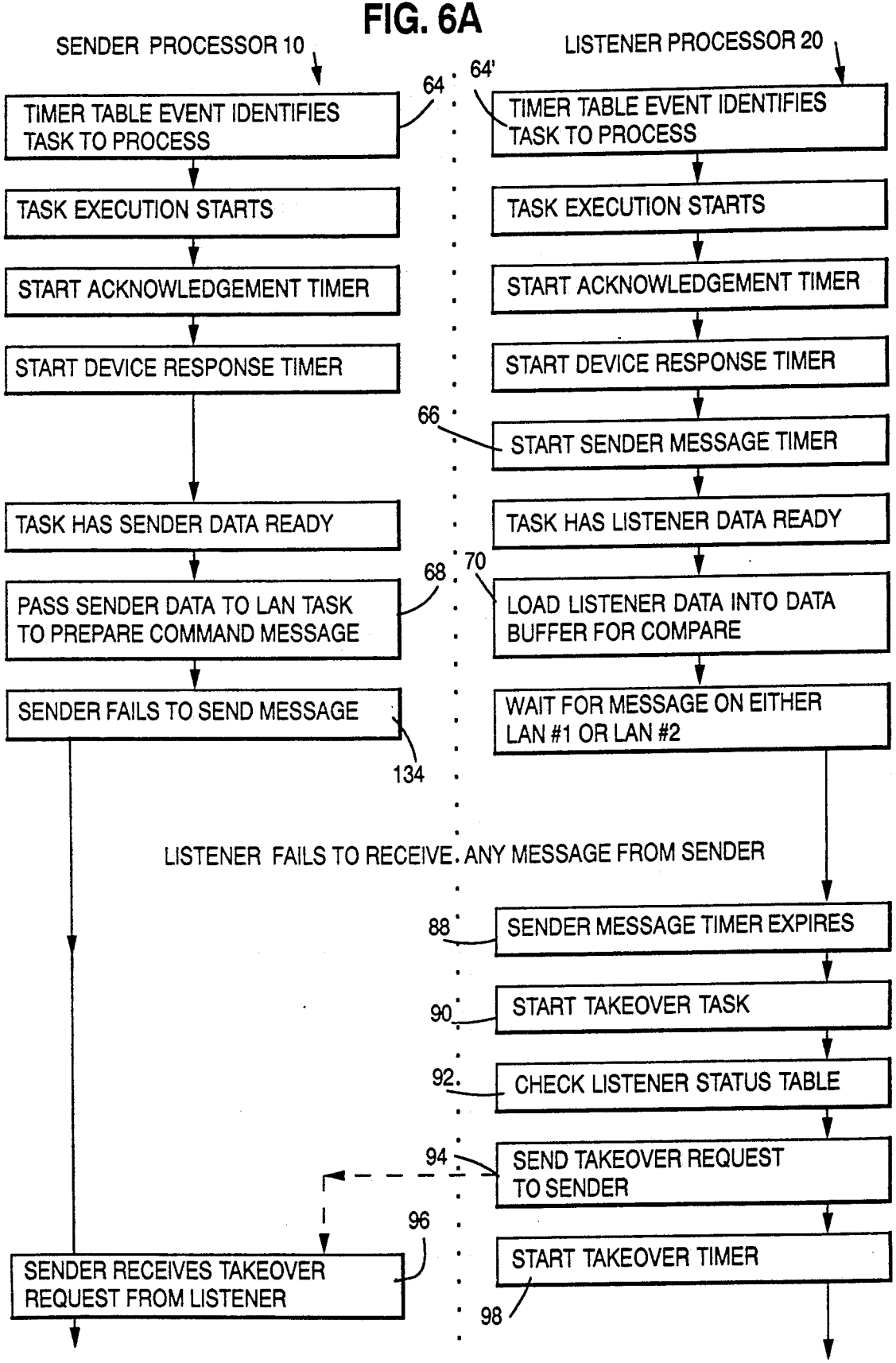
FIG. 6, consisting of FIGS. 6A and 6B, is a flow diagram of the sender processor and the listener processor in operation where the sender processor has a total failure which results in the preemptive takeover by the listener.

Reference is now made to FIG. 6 which shows the operation of the sender processor 10 and the listener processor 20 when the sender processor has a total failure resulting in the preemptive takeover by the listener. Steps 64 through 102' of the sender processor operation in FIG. 6 are the same as those described for FIG. 5. Steps 64' through 98 for the listener processor 20 in FIG. 6 are the same as those described for FIG. 5. As can be seen in FIG. 6, the sender processor 10 fails to send any response in is step 152 to the takeover request sent by the listener processor 20 in its step 94. Then in step 154 for the listener processor 20, the takeover timer expires without receiving response from the sender processor. This causes the listener processor 20 to automatically change its status to "sender" state in step 144 and then to continue with the same steps 146, 148 and 150 as were described in FIG. 5. Thus the listener processor 20 has preemptively taken over the operation of the sender and resumes normal sender data flow.

Table 5 provides an example of the application of the invention to television network broadcast scheduling. Table 5 shows example data tables for performing the broadcasting of an advertising spot at 10 hours, 30 minutes consisting of two consecutive 30 minutes ads. The event execution table 48 contains two classes 23 and 14. The control schedule table 50 contains the elements in those two classes, elements 2300 through 2304 correspond to class 23 and element 1400 corresponds to class 14. Class 23 starts at 10 hours, 29 minutes, 30 seconds with the event cueing video tape 1. The next event 2301 follows the completion event 2300 by five seconds, cueing video tape 2. The third event, 2302 follows by five seconds to switch the video tapes 1 and 2 into the network. The fourth event, 2303, starts at 10 hours, 30 minutes, and plays tape 1. The fifth event, 2304, starts at 10 hours, 30 minutes, 30 seconds and plays tape 2. This completes the class 23 events and the event execution table 48 then proceeds to class 14 which is specified in the control schedule table 50 as consisting of event 1400 which switches to a satellite feed. Thus it is seen that the real time, fail safe process control system and method invention can be applied to the scheduling of television programming and the control of television network broadcasting equipment.

Table 6 provides another example of the application of the invention to vehicular traffic control. Table 6 shows an example of data tables for vehicular traffic control and it includes an illustration of a branch on a condition. Table 6 shows that the working store 65 includes a class 24 whose component events are stored in the control schedule table 50 as events 2400 through 2404. The event execution table 48 currently has two classes, class 14 and class 23, class 14 having its component events specified in the control schedule table 50 as event 1400 and class 23 having its component events specified in the control schedule table 50 as events 2400 through 2404. The event execution table 48 has class 14 which starts at 11 hours, 0 minutes, where the event 1400 specified in the control schedule table 50 controls the measurement of traffic volume at 1st Avenue. If the measured traffic volume is greater than 100 cars per minute, then class 24 is to be loaded from the working store 65 into the event execution table 48 to replace the existing class 23 currently in the event execution table 48. If the measured traffic volume is not greater than 100 cars per minute, then class 23 with its component events 2300 through 2304 will be sequentially executed starting at 12 hours, 0 minutes and they will sequentially set the green lights to a one minute duration at 1st Avenue through 5th Avenue. Alternately, if at 11:00 the measured traffic volume is greater than 100 cars per minute, then class 24 will be accessed from the working store 65 and will replace class 23 in the event execution table 48 so that at 12 hours, 0 minutes, the sequence of events 2400 through 2404 will be executed setting the green lights to a duration of two minutes at 1st Avenue through 5th Avenue. Thus it can be seen that the real time, fail safe process control system and method invention can be applied to applications such as vehicular traffic control. Still further, it can be seen that real time changes in conditions can be produce branch operations to alternate scheduled sequences of events.

Figure 8:
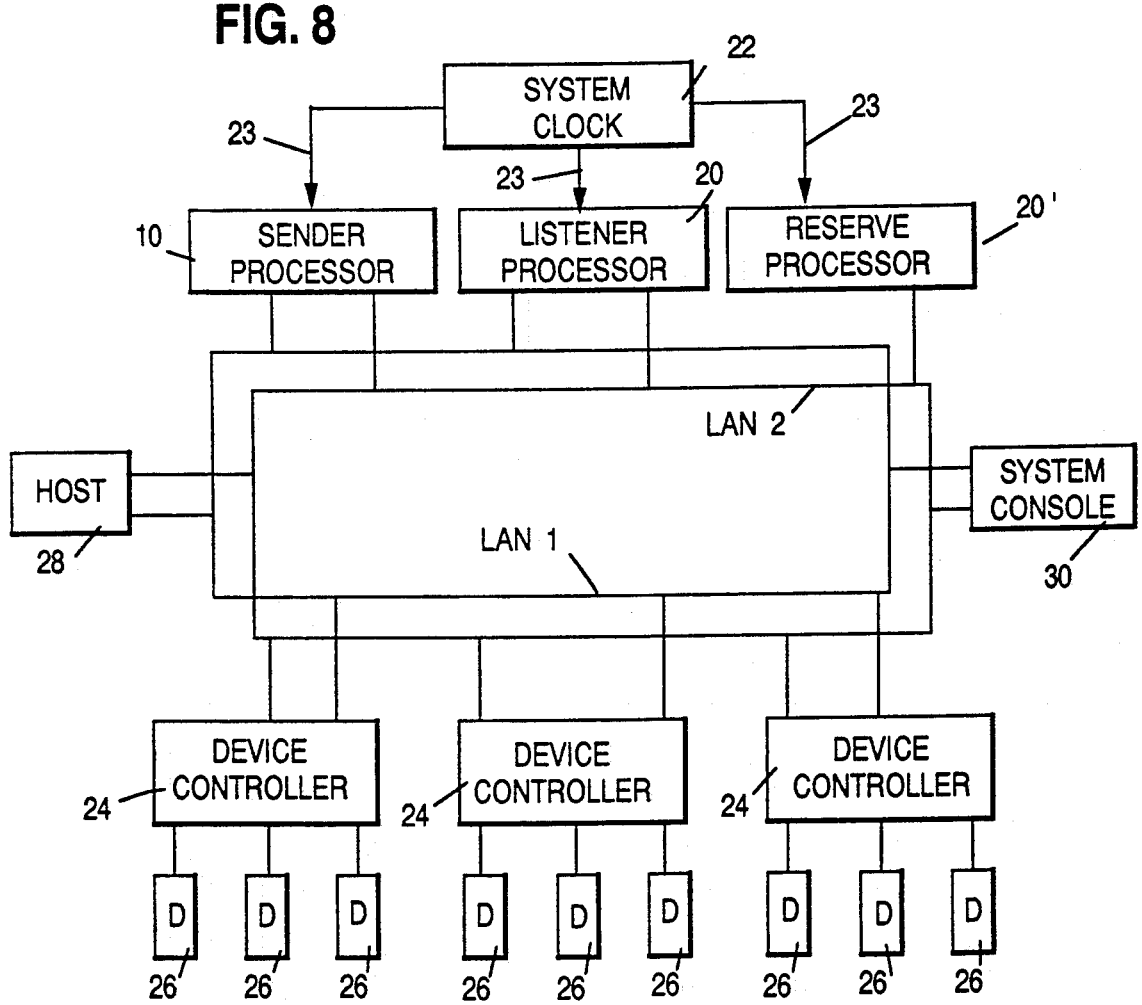
FIG. 8 is an overall architectural diagram of an alternate embodiment of the real time fail safe process control system, including a reserve processor 20'.
Figure 9:
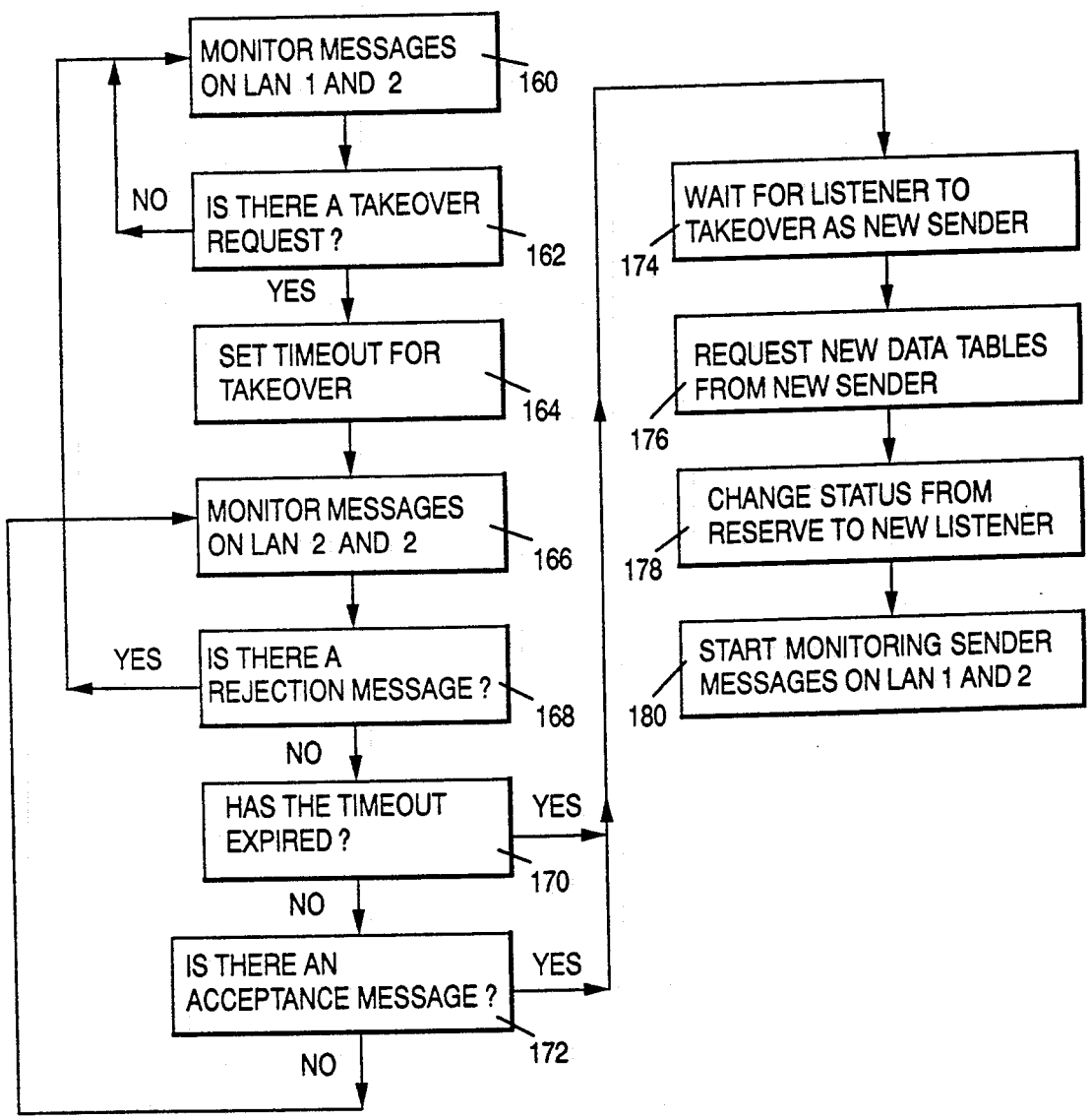
FIG. 9 is a flow diagram of the operation of the reserve processor 20' when it assumes the status of a new listener.

An alternate embodiment of the invention is shown in FIG. 8 wherein the architecture of FIG. 1 is augmented by adding a reserve processor 20'. The reserve processor 20' can be changed to a listener processor status when the current listener processor 20 is required to take over sender operations. The operation of the reserve processor 20' in assuming the status of a new listener, is shown in the flow diagram of FIG. 9. In FIG. 9, the reserve processor 20' monitors messages on LAN1 and LAN2 in step 160. In step 162, if the reserve processor 20' detects a takeover request output by the listener processor 20 to the sender processor 10, then in step 164, the reserve processor 20' sets a timeout interval in its timer table 44, the reserve processor 20' having the same hardware and software configuration of FIG. 2 as does the listener processor 20. The reserve processor then continues to monitor messages on LAN1 and LAN2 in step 166. If the reserve processor 20' detects that there is a rejection message issued by the sender processor 10 in step 168, then the reserve processor 20' returns to step 160, monitoring messages on the LAN1 and LAN2. Alternately, if no rejection message is detected in step 168, the reserve processor 20' determines whether the timeout has expired for the takeover in step 170. If the timeout has expired, then the reserve processor goes to step 174 to wait for the listener to takeover as a new sender. If the timeout has not expired, then the reserve processor 20' goes to step 172 to determine if an acceptance message has been issued on the LAN by the sender processor 10. If an acceptance message has not been issued, then step 172 loops back to step 166 and the reserve processor continues to monitor LAN1 and LAN2. If an acceptance message has been issued by the sender processor 10, then step 172 goes to step 174 where the reserve processor waits for the listener to take over as the new sender. After the listener processor 20 takes over sender processor operations as a new sender, the reserve processor 20' requests new data tables from the new sender 20 in step 176. Reserve processor 20' then changes its status from the reserve to a new listener in step 178. Then the reserve processor 20' in its new status as a listener processor, starts monitoring sender messages on LAN1 and LAN2 for normal listener processor operations.

Although a specific embodiment of the invention has been disclosed, it will be understood by those having skill in the art that changes can be made to that specific embodiment without departing from the spirit and the scope of the invention.

TABLE 1

Organization of Data Tables

Event Execution Table 48

| Class ID | Early Start | CST Loc | Class Flag |
|---|---|---|---|
| 23 | 10:29:30 | DF40 | Not Started |
|  |  |  | Started |
|  |  |  | Completed |
|  |  |  | Halted |

Control Schedule Table 50

| Buff Addr | Seq No. | Abs/ Rel | Depend Events | Rel Evt | Exec Time | Ack Time | Rsp Time | Data |
|---|---|---|---|---|---|---|---|---|
| DF40 | 2300 | Abs | DF44 | 0 | 10:29:30 | 10 | 100 | Position Work Piece |

Event Status Table 52

| Seq No. | Event Status | Rel Cnt | Completion Code | Start Time | Complete Time |
|---|---|---|---|---|---|
| 2300 | Not Sched |  | Not Complt | 10:29:30 |  |
|  | Scheduled |  | Completed |  |  |
|  | Msg Sent |  | Soft Fail |  |  |
|  | ACK Recvd |  | Hard Fail |  |  |
|  | Rsp Recvd |  |  |  |  |
|  | Halted |  |  |  |  |

Timer Table 44

| Time ID | Exec Time | Process Started | Calling Process | Norm/ Cycle | Data to Pass |
|---|---|---|---|---|---|
| 5 | 10:29:30 | Exec | Sched | norm | 2300 |

TABLE 2

Data Tables Before Start of Class at Time 10:29:30

Event Execution Table 48

| Class ID | Early Start | CST Loc | Class Flag |
|---|---|---|---|
| 23 | 10:29:30 | DF40 | Not Started |
| 14 | 10:30:00 | E600 | Not Started |

Control Schedule Table 50

| Buff Addr | Seq No. | Abs/ Rel | Depend Events | Rel Evt | Exec Time | Ack Time | Rsp Time | Data |
|---|---|---|---|---|---|---|---|---|
| DF40 | 2300 | Abs | DF44 | 0 | 10:29:30 | 10 | 100 | Position Work Piece |
| DF44 | 2301 | Rel | DF48 | 1 | 2,000 | 10 | 100 | Rotate Turret |
| DF48 | 2302 | Rel | DF52 | 2 | 500 | 10 | 100 | Engage cutter |
| DF52 | 2303 | Rel | DF56 | 3 | 500 | 10 | 100 | Advance cutter X dir |
| DF56 | 2304 | Rel | — | 4 | 2,000 | 10 | 100 | Disengage cutter |
| E600 | 1400 | Abs | — | 0 | 10:30:00 | 10 | 100 | Eject Work Piece |
| D400 | 1600 | Abs | — | 0 | 10:30:00 | 10 | 100 | Reposition Work Piece |

Event Status Table 52

| Seq No. | Event Status | Rel Cnt | Completion Code | Start Time | Complete Time |
|---|---|---|---|---|---|
| 2300 | not sched | 0 |  | 10:29:30 |  |
| 2301 | not sched | 1 |  |  |  |
| 2302 | not sched | 2 |  |  |  |

TABLE 2-continued

Data Tables Before Start of Class at Time 10:29:30

| | | |  | |
|---|---|---|---|---|
| 2303 | not sched | 3 | | |
| 2304 | not sched | 4 | | |
| 1400 | not sched | 0 | 10:30:00 | |

Timer Table 44

| Time ID | Exec Time | Process Started | Calling Process | Norm/ Cycle | Data to Pass |
|---|---|---|---|---|---|
| 01 | 10:29:30 | Exec | Sched | norm | 2300 |
| 02 | 10:29:30 + 1 ms | TO-Msg | Exec | norm | 2300 |
| 03 | 10:29:30 + 10 ms | TO-Ack | Exec | norm | 2300 |
| 04 | 10:29:30 + 100 ms | TO-Rsp | Exec | norm | 2300 |

TABLE 3

Data Tables at Time 10:29:32 Showing Real Time Update of Next Scheduled Class

Event Execution Table 48

| Class ID | Early Start | CST Loc | Class Flag |
|---|---|---|---|
| 23 | 10:29:30 | DF40 | Started |
| 16 | 10:30:00 | D400 | Not Started |

Control Schedule Table 50

| Buff Addr | Seq No. | Abs/ Rel | Depend Events | Rel Evt | Exec Time | Ack Time | Rsp Time | Data |
|---|---|---|---|---|---|---|---|---|
| DF40 | 2300 | Abs | DF44 | 0 | 10:29:30 | 10 | 100 | Position Work Piece |
| DF44 | 2301 | Rel | DF48 | 1 | 2,000 | 10 | 100 | Rotate Turret |
| DF48 | 2302 | Rel | DF52 | 2 | 500 | 10 | 100 | Engage cutter |
| DF52 | 2303 | Rel | DF56 | 3 | 500 | 10 | 100 | Advance cutter X dir |
| DF56 | 2304 | Rel | — | 4 | 2,000 | 10 | 100 | Disengage cutter |
| E600 | 1400 | Abs | — | 0 | 10:30:00 | 10 | 100 | Eject Work Piece |
| D400 | 1600 | Abs | — | 0 | 10:30:00 | 10 | 100 | Reposition Work Piece |

Event Status Table 52

| Seq No. | Event Status | Rel Cnt | Completion Code | Start Time | Complete Time |
|---|---|---|---|---|---|
| 2300 | Dev Rec'd | 0 | completed | 10:29:30 | 10:29:32 |
| 2301 | scheduled | 0 | not complt | 10:29:32 | |
| 2302 | not sched | 1 | | | |
| 2303 | not sched | 2 | | | |
| 2304 | not sched | 3 | | | |
| 1600 | not sched | 0 | | 10:30:00 | |

Timer Table 44

| Time ID | Exec Time | Process Started | Calling Process | Norm/ Cycle | Data to Pass |
|---|---|---|---|---|---|
| 01 | 10:29:30 | Exec | Sched | norm | 2300 |
| 06 | 10:29:32 | Exec | Sched | norm | 2301 |
| 07 | 10:29:32 + 1 ms | TO-Msg | Exec | norm | 2301 |
| 08 | 10:29:32 + 10 ms | TO-Ack | Exec | norm | 2301 |
| 09 | 10:29:32 + 100 ms | TO-Rsp | Exec | norm | 2301 |

TABLE 4

Takeover by Listener due to Sender Failure at Time 10:29:32

| Time | Sender's Status Table 54 | Listener's Receive Data Buffer 56 | Listener Data Buffer 58 | Listener's Send Data Buffer 62 |
|---|---|---|---|---|
| 10:29:30 | OK | 2300 Msg Position WP | 2300 Msg Position WP | |
| +5 ms | OK | Ack Received | Ack Received | |
| +50 ms | OK | Dev Rsp Rcvd | Dev Rsp Rcvd | |
| 10:29:32 | Fail | — | 2301 Msg Rotate Turret | |

[Sender Fails. Takeover Request is Made by Listener in FIG. 5.]
[Sender Transmits Agreement to Takeover by Listener in FIG. 5.]

| | | | | |
|---|---|---|---|---|
| +500 ms | Fail | — | 2302 Msg Engage Cutter | |

[Listener Accesses Accumulating Messages in Listener Data Buffer and Outputs Messages through Send Data Buffer to LAN.]

| | | | | |
|---|---|---|---|---|
| 10:29:33 | Fail | 2301 Msg Rotate Turret | 2303 Msg Advance Cut. | 2301 Msg Rotate Turret |
| +5 ms | Fail | Ack Received | | |
| +50 ms | Fail | Dev Rsp Rcvd | | |
| +500 ms | Fail | 2302 Msg Engage Cutter | | 2302 Msg Engage Cutter |

TABLE 4-continued

Takeover by Listener due to Sender Failure at Time 10:29:32

| Time | Sender's Status Table 54 | Listener's Receive Data Buffer 56 | Listener Data Buffer 58 | Listener's Send Data Buffer 62 |
|---|---|---|---|---|
| +5 ms | Fail | Ack Received | | |
| +50 ms | Fail | Dev Rsp Rcvd | | |
| +500 ms | Fail | 2303 Msg Advance Cut. | | 2303 Msg Advance Cut. |
| +5 ms | Fail | Ack Received | | |
| +50 ms | Fail | Dev Rsp Rcvd | | |
| 10:29:35 | Fail | 2304 Msg Disengage Cut. | 2304 Msg Disengage Cut. | 2304 Msg Disengage Cut. |

[Listener is Now Transmitting Messages on Intended Schedule.]

TABLE 5

Example Data Tables for Television Network Broadcast Scheduling

Event Execution Table 48

| Class ID | Early Start | CST Loc | Class Flag |
|---|---|---|---|
| 23 | 10:29:30 | DF40 | Not Started |
| 14 | 10:31:00 | E600 | Not Started |

Control Schedule Table 50

| Buff Addr | Seq No. | Abs/Rel | Depend Events | Rel Evt | Exec Time | Ack Time | Rsp Time | Data |
|---|---|---|---|---|---|---|---|---|
| DF40 | 2300 | Abs | DF44 | 0 | 10:29:30 | 10 | 100 | Cue Video Tape 1 |
| DF44 | 2301 | Rel | DF48 | 1 | 5,000 | 10 | 100 | Cue Video Tape 2 |
| DF48 | 2302 | Rel | — | 2 | 5,000 | 10 | 100 | Switch into Network |
| DF52 | 2303 | Abs | — | 0 | 10:30:00 | 10 | 100 | Play Tape 1 |
| DF56 | 2304 | Abs | — | 0 | 10:30:30 | 10 | 100 | Play Tape 2 |
| E600 | 1400 | Abs | — | 0 | 10:31:00 | 10 | 100 | Switch to Satellite |

TABLE 6

Example Data Tables for Vehicular Traffic Control Including Branch on Condition

Working Store 65

| Class ID | Early Start | CST Loc | Class Flag |
|---|---|---|---|
| 24 | 12:00:00 | EF40 | Not Started |

Event Execution Table 48

| Class ID | Early Start | CST Loc | Class Flag |
|---|---|---|---|
| 14 | 11:00:00 | E600 | Not Started |
| 23 | 12:00:00 | DF40 | Not Started |

Control Schedule Table 50

| Buff Addr | Seq No. | Abs/Rel | Depend Events | Rel Evt | Exec Time | Ack Time | Rsp Time | Data |
|---|---|---|---|---|---|---|---|---|
| E600 | 1400 | Abs | — | 0 | 11:00:00 | 10 | 100 | Measure Traffic volume at 1st Ave and If greater than 100/min then load class 24 from working store 65 into Event Execution Table replacing class 23 |
| DF40 | 2300 | Abs | DF44 | 0 | 12:00:00 | 10 | 100 | Set 1st Ave green 1 min |
| DF44 | 2301 | Rel | DF48 | 1 | 30,000 | 10 | 100 | Set 2nd Ave green 1 min |
| DF48 | 2302 | Rel | DF52 | 2 | 30,000 | 10 | 100 | Set 3rd Ave green 1 min |
| DF52 | 2303 | Rel | DF56 | 3 | 30,000 | 10 | 100 | Set 4th Ave green 1 min |
| DF56 | 2304 | Rel | — | 4 | 30,000 | 10 | 100 | Set 5th Ave green 1 min |
| EF40 | 2400 | Abs | EF44 | 0 | 12:00:00 | 10 | 100 | Set 1st Ave green 2 min |
| EF44 | 2401 | Rel | EF48 | 1 | 30,000 | 10 | 100 | Set 2nd Ave green 2 min |
| EF48 | 2402 | Rel | EF52 | 2 | 30,000 | 10 | 100 | Set 3rd Ave green 2 min |
| EF52 | 2403 | Rel | EF56 | 3 | 30,000 | 10 | 100 | Set 4th Ave green 2 min |
| EF56 | 2404 | Rel | — | 4 | 30,000 | 10 | 100 | Set 5th Ave green 2 min |

We claim:

1. A fail safe data processing system for real time control of a plurality of devices, comprising:

a LAN having a plurality of devices coupled thereto, for communicating device control messages to said plurality of devices;

a system clock for generating a periodic time base for said system;

a first data processor operating in a sender mode, having a clock input coupled to said system clock, coupled to said LAN and having a memory storing a first control schedule table, a processor status table and a control program, for sequentially executing instruction steps in said control program for accessing data from said first control schedule table and generating a first sequence of device command messages, and outputting said messages to said LAN for transmission to said plurality of devices and for updating a health status of said first processor in said processor status table;

a second data processor operating in a listener mode, having a clock input coupled to said system clock, coupled to said LAN and having a memory storing a second control schedule table and a control program, for sequentially executing instruction steps in said control program therein for accessing data from said second control schedule table and generating a second sequence of device command messages which are the same as said first sequence, and buffering said second sequence of device command messages in a listener data buffer;

said second data processor receiving said first sequence of command messages on said LAN and transferring said first sequence from said LAN to a receive data buffer in said second data processor;

a compare means in said second data processor coupled to said listener data buffer and to said receive data buffer, for comparing said first sequence of device command messages with said second sequence of device command messages;

a listener takeover means in said second data processor coupled to said compare means, for outputting a takeover request on said LAN to said first data processor when said first sequence of device command messages are not the same as said second sequence of device command messages, said listener takeover means further starting a takeover interval timer in said second data processor to expire at a predetermined timeout value;

a takeover response means in said first data processor coupled to said LAN, for receiving said takeover request and in response thereto, checking said processor status table to determine whether said first processor is able to continue operating in said sender mode;

said takeover response means outputting through said LAN to said second processor an agreement message if said processor status table indicates that said first processor is not able to continue said sender mode, said listener takeover means in said second data processor, in response thereto, changing said second processor to sender mode, accessing said second sequence of device command messages in said listener data buffer and outputting over said LAN, device command messages to said plurality of devices.

2. The system of claim 1, which further comprises:
said takeover response means outputting through said LAN to said second processor a rejection message if said processor status table indicates that said first processor is able to continue said sender mode, said listener takeover means in said second data processor, in response thereto, sending a request to said first data processor for a new copy of said control schedule table, said first data processor in response thereto, sending said new copy of said control schedule table to said second data processor.

3. The system of claim 1, which further comprises:
said listener takeover means in said second data processor changing said second data processor to said sender mode of operation if said takeover interval timer expires before said first data processor responds to said takeover request, accessing said second sequence of device command messages in said listener data buffer and outputting over said LAN, device command messages to said plurality of devices.

4. A fail safe data processing system for real time control of a plurality of devices, comprising:
a network having a plurality of devices coupled thereto, for communicating device control messages to said plurality of devices;

a system clock for generating a periodic time base for said system;

a first data processor coupled to said network, operating in a sender mode, having a clock input coupled to said system clock, and having a memory storing a first control schedule table, a processor status table and a control program, for accessing data from said first control schedule table and generating a first sequence of device command messages which are output to said plurality of devices and for updating a health status of said first processor in said processor status table;

a second data processor coupled to said network, operating in a listener mode, having a clock input coupled to said system clock, and having a memory storing a second control schedule table and a control program, for accessing data from said second control schedule table and generating a second sequence of device command messages, and buffering said second sequence of device command messages in a listener data buffer;

said second data processor receiving said first sequence of command messages and transferring them to a receive data buffer;

a compare means in said second data processor coupled to said listener data buffer and to said receive data buffer, for comparing said first sequence of device command messages with said second sequence of device command messages;

a listener takeover means in said second data processor coupled to said compare means, for outputting a takeover request on said network to said first data processor when said first sequence of device command messages are not the same as said second sequence of device command messages;

a takeover response means in said first data processor, for receiving said takeover request and in response thereto, checking said processor status table to determine whether said first processor should suspend operating in said sender mode;

said takeover response means outputting on said network to said second processor an agreement message, said listener takeover means in said second data processor, in response thereto, changing said second processor to said sender mode, accessing said second sequence of device command messages in said listener data buffer and outputting over said network device command messages to said plurality of devices.

5. The system of claim 4, which further comprises:

a reserve processor coupled to said network, having a clock input coupled into said system clock, for assuming a status as a listener processor when said second processor changes to said sender mode.

6. In a fail safe data processing system including a sender data processor and a listener data processor coupled in a network to a plurality of devices, the method comprising the steps of:

accessing data from a first control schedule table in said sender data processor, generating a first sequence of device command messages, and outputting said messages over said network to said plurality of devices;

updating a status of said sender data processor in a processor status table;

accessing data from a second control schedule table in said listener data processor, generating a second sequence of device command messages, and buffering said second sequence of device command messages in a listener data buffer;

receiving said first sequence of command messages in a receive data buffer in said listener data processor;

comparing said first sequence of device command messages with said second sequence of device command messages;

outputting a takeover request from said listener data processor to said sender data processor when said first sequence of device command messages are not the same as said second sequence of device command messages;

receiving said takeover request at said sender data processor and in response thereto, checking said processor status table to determine whether said sender data processor should continue operating in said sender mode;

outputting an agreement message from sender data processor to said listener data processor if said processor status table indicates that said sender data processor should not continue said sender mode;

changing said listener data processor to said sender mode, accessing said second sequence of device command messages in said listener data buffer and outputting them over said to said plurality of devices.

7. The method of claim 6, which further comprises the steps of:

outputting a rejection message from said sender data processor to said listener data processor if said processor status table indicates that said sender data processor should continue said sender mode;

sending a request from said listener data processor to said sender data processor for a copy of said first control schedule table, said sender data processor in response thereto, sending said copy of said first control schedule table to said listener data processor.

8. The method of claim 6, which further comprises the steps of:

changing said listener data processor to said sender mode of operation if a takeover interval expires before said sender data processor responds to said takeover request;

accessing said second sequence of device command messages in said listener data buffer and outputting them over said network to said plurality of devices.

9. A fail safe data processing system for real time control of a plurality of devices, comprising:

a first LAN having a plurality of devices coupled thereto, for communicating device control messages to said plurality of devices;

a second LAN having said plurality of devices coupled thereto, for communicating device control messages to said plurality of devices;

a system clock for generating a periodic time base for said system;

a first data processor operating in a sender mode, having a clock input coupled to said system clock, having a first dual LAN interface means coupled to said first LAN and coupled to said second LAN, and having a memory storing a first control schedule table, a processor status table and a control program, for sequentially executing instruction steps in said control program for accessing data from said first control schedule table and generating a first sequence of device command messages, and outputting said messages through said first dual LAN interface means to said first LAN and said second LAN for transmission to said plurality of devices and for updating a health status of said first processor in said processor status table;

a second data processor operating in a listener mode, having a clock input coupled to said system clock, having a second dual LAN interface means coupled to said first LAN and coupled to said second LAN, and having a memory storing a second control schedule table and a control program, for sequentially executing instruction steps in said control program therein for accessing data from said second control schedule table and generating a second sequence of device command messages which are the same as said first sequence, and buffering said second sequence of device command messages in a listener data buffer;

said second dual LAN interface means in said second data processor receiving said first sequence of command messages on said first LAN before receiving said first sequence on said second LAN and transferring said first sequence from said first LAN to a receive data buffer in said second data processor;

a compare means in said second data processor coupled to said listener data buffer and to said receive data buffer, for comparing said first sequence of device command messages with said second sequence of device command messages;

a listener takeover means in said second data processor coupled to said compare means, for outputting a takeover request on said first and second LAN to said first data processor when said first sequence of device command messages are not the same as said second sequence of device command messages, said listener takeover means further starting a takeover interval timer in said second data processor to expire at a predetermined timeout value;

a takeover response means in said first data processor coupled to said dual LAN interface means, for receiving said takeover request and in response thereto, checking said processor status table to determine whether said first processor is able to continue operating in said sender mode;

said takeover response means outputting through said first dual LAN interface means to said second processor an agreement message to takeover the sender mode of operation if said processor status table indicates that said first processor is not able to continue said sender mode, said listener takeover means in said second data processor, in response thereto, changing said second processor to said sender mode, accessing said second sequence of device command messages in said listener data buffer and outputting over said second dual LAN interface means therein, device command messages to said plurality of devices.

10. The system of claim 9, which further comprises:
said takeover response means outputting through said first dual LAN interface means to said second processor and rejection message if said processor status table indicates that said first processor is able to continue said sender mode, said listener takeover means in said second data processor, in response thereto, sending a request to said first data processor for a new copy of said control schedule table, said first data processor in response thereto, sending said new copy of said control schedule table to said second data processor.

11. The system of claim 10, which further comprises:
said listener takeover means in said second data processor changing said second data processor to said sender mode of operation if said takeover interval timer expires before said first data processor responds to said takeover request, accessing said second sequence of device command messages in said listener data buffer and outputting over said second dual LAN interface means therein, device command messages to said plurality of devices.

12. The system of claim 9, which further comprises:
a third data processor operating in a reserve mode, having a clock input coupled to said system clock, having a third dual LAN interface means coupled to said first LAN and coupled to said second LAN, and having a memory storing said control program, for sequentially executing instruction steps in said control program for monitoring said first and said second LAN;
a takeover response means in said third data processor coupled to said dual LAN interface means, for monitoring said takeover request and in response thereto;
said takeover response means in said third data processor, changing said third processor to said listener mode, if said second data processor changes its status to said sender mode.

13. The system of claim 9, wherein said plurality of devices are process control devices.

14. The system of claim 9, wherein said plurality of devices are television network broadcast control devices.

15. The system of claim 9, wherein said plurality of devices are vehicular traffic control devices.

* * * * *